US012249757B2

(12) United States Patent
Severin et al.

(10) Patent No.: US 12,249,757 B2
(45) Date of Patent: Mar. 11, 2025

(54) CONVERTIBLE STRAND AND POLE SMALL CELL MOUNTS AND ASSEMBLIES

(71) Applicant: Outdoor Wireless Networks LLC, Claremont, NC (US)

(72) Inventors: Matthew Severin, Grapevine, TX (US); Robert Campbell, Irving, TX (US)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 0 days.

(21) Appl. No.: 18/424,969

(22) Filed: Jan. 29, 2024

(65) Prior Publication Data

US 2024/0170833 A1 May 23, 2024

Related U.S. Application Data

(60) Continuation of application No. 18/188,816, filed on Mar. 23, 2023, now Pat. No. 11,923,603, which is a
(Continued)

(51) Int. Cl.
*H04M 1/00* (2006.01)
*H01Q 1/12* (2006.01)
(Continued)

(52) U.S. Cl.
CPC .......... *H01Q 1/246* (2013.01); *H01Q 1/1242* (2013.01); *H01Q 1/42* (2013.01)

(58) Field of Classification Search
CPC ...... H01Q 1/246; H01Q 1/228; H01Q 1/1242; H01Q 1/244; H04M 1/0249; H04M 1/0256; H04M 1/026
See application file for complete search history.

(56) References Cited

U.S. PATENT DOCUMENTS 8,687,531 B2 4/2014 Smith
9,705,177 B1 7/2017 Schmidt et al.
(Continued)

FOREIGN PATENT DOCUMENTS

CN 107268439 A 10/2017
WO 2018226808 A1 12/2018

OTHER PUBLICATIONS

"https://www.reddit.com/r/tmobile/comments/5k01tu/new_extra_small_small_cell_los_angeles_ca_capacity/", retrieved Sep. 8, 2022 from https://www.reddit.com/r/tmobile/comments/5k01tu/new_extra_small_small_cell_los_angeles_ca_capacity/(publication date unknown, at least no later than 2016), 16 pp.
(Continued)

*Primary Examiner* — Tuan Pham
(74) *Attorney, Agent, or Firm* — Myers Bigel, P.A.

(57) ABSTRACT

The present disclosure describes strand mounts for small cell radios. The strand mount assembly includes a cable strand and a strand mount. The strand mount includes two or more interconnected frame sections that form a frame, each frame section having opposing sides configured such that one or more small cell radios and/or antennas can be mounted thereto. The strand mount further includes a plurality of mount apertures sized and configured to receive the cable strand. Each of the mounting apertures is collinear with the other mounting apertures to create an unimpeded opening that the cable strand extends through, thereby mounting the strand mount on the cable strand. Alternative strand mounts and strand mount assemblies are also described.

14 Claims, 24 Drawing Sheets

Related U.S. Application Data continuation of application No. 18/055,929, filed on Nov. 16, 2022, now Pat. No. 11,646,484, which is a division of application No. 17/145,494, filed on Jan. 11, 2021, now Pat. No. 11,581,630.

(60) Provisional application No. 63/088,612, filed on Oct. 7, 2020, provisional application No. 62/975,339, filed on Feb. 12, 2020.

(51) Int. Cl.
*H01Q 1/24* (2006.01)
*H01Q 1/42* (2006.01)

(56) References Cited

U.S. PATENT DOCUMENTS

| | | | | |
|---|---|---|---|---|
| 10,797,380 | B2 | 10/2020 | Roy et al. | |
| 11,581,630 | B2 | 2/2023 | Severin et al. | |
| 11,646,484 | B2 | 5/2023 | Severin et al. | |
| 2007/0237484 | A1 | 10/2007 | Reagan et al. | |
| 2009/0231828 | A1 * | 9/2009 | Madore | H05K 5/0204<br>361/825 |
| 2011/0075646 | A1 * | 3/2011 | Smith | H04W 84/14<br>370/338 |
| 2011/0309996 | A1 | 12/2011 | Abumrad et al. | |
| 2014/0062804 | A1 * | 3/2014 | Abumrad | H01Q 1/24<br>343/702 |

OTHER PUBLICATIONS

"PCT Notification of Transmittal of the International Search Report and the Written Opinion of the International Searching Authority, or the Declaration", in corresponding PCT International Application No. PCT/US2021/012889, mailed Apr. 29, 2021, (16 pages).

* cited by examiner

CONVERTIBLE STRAND AND POLE SMALL CELL MOUNTS AND ASSEMBLIES

RELATED APPLICATION(S)

The present application is a continuation of U.S. patent application Ser. No. 18/188,816, filed Mar. 23, 2023, which is a continuation of U.S. patent application Ser. No. 18/055,929, filed Nov. 16, 2022, now issued U.S. Pat. No. 11,646,484, which is a divisional of U.S. patent application Ser. No. 17/145,494, filed Jan. 11, 2021, now issued U.S. Pat. No. 11,581,630, which claims priority to and the benefit of U.S. Provisional Patent Application Ser. No. 62/975,339, filed Feb. 12, 2020, and U.S. Provisional Patent Application Ser. No. 63/088,612, filed Oct. 7, 2020, the disclosures of which are hereby incorporated herein in their entireties.

FIELD

The present application is directed generally toward telecommunications equipment, and more particularly, small cell mounts and small cell mount assemblies.

BACKGROUND

Currently, very few strand mounts 10 for telecommunications equipment, such as cellular radios, exist (see, e.g., FIGS. 1A-1B). Strand mounts enable equipment to be mounted on cables, wires, or the like, that extend between utility poles (e.g., telephone or power poles). Of the strand mounts that exist in the market, none have the versatility and/or strength to be mounted to a pole. There may be a need for strand mounts that provide the ability to be mounted on both cable strands and poles, while also allowing for easy installation and less burdensome serviceability.

SUMMARY

A first aspect of the present invention is directed to a strand mount. The strand mount assembly includes a cable strand and a strand mount. The strand mount includes two or more interconnected frame sections that form a frame, each frame section having opposing sides configured such that one or more small cell radios and/or antennas can be mounted thereto. The strand mount further includes a plurality of mount apertures sized and configured to receive the cable strand. Each of the mounting apertures is collinear with the other mounting apertures to create an unimpeded opening that the cable strand extends through, thereby mounting the strand mount on the cable strand.

Another aspect of the present invention is directed to a strand mount. The strand mount includes a top plate, a bottom plate, and opposing side plates. The plates form a housing having an interior cavity dimensioned to fit around one or more small cell radios and/or antennas. The strand mount further includes a plurality of mounting arms removably attached to the top plate and extending downwardly into the interior cavity. Each mounting arm is configured such that a small cell radio and/or antenna can be mounted thereto. The strand mount further includes one or more mounting brackets configured to hang the strand mount on a cable strand.

Another aspect of the present invention is directed to a strand mount. The strand mount includes a top plate, a bottom plate, and opposing side plates. The plates form a housing having an interior cavity dimensioned to fit around one or more small cell radios and/or antennas. The strand mount further includes a center mounting frame secured to an inner surface of the top plate and extending downwardly into the interior cavity. The mounting frame has opposing sides configured such that one or more small cell radios and/or antennas can be mounted thereto. The strand mount further includes one or more mounting brackets configured to hang the strand mount on a cable strand.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
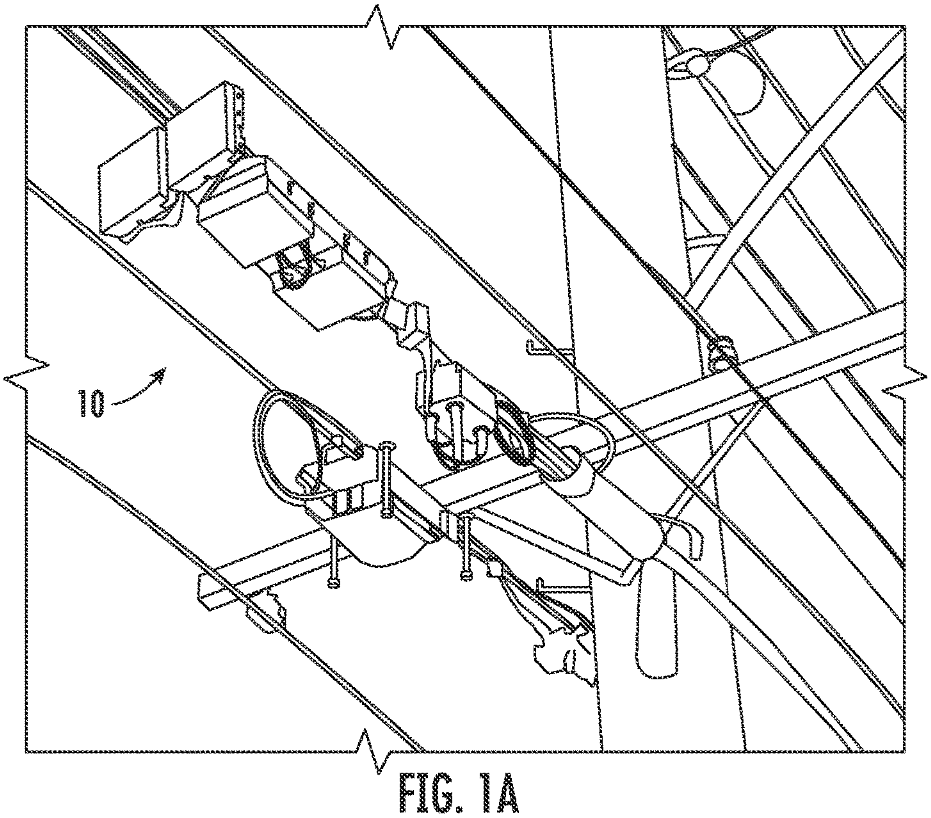
FIG. 1A PRIOR ART
FIGS. 1A-1B are photographs of prior known strand mounts.
Figure 1B:
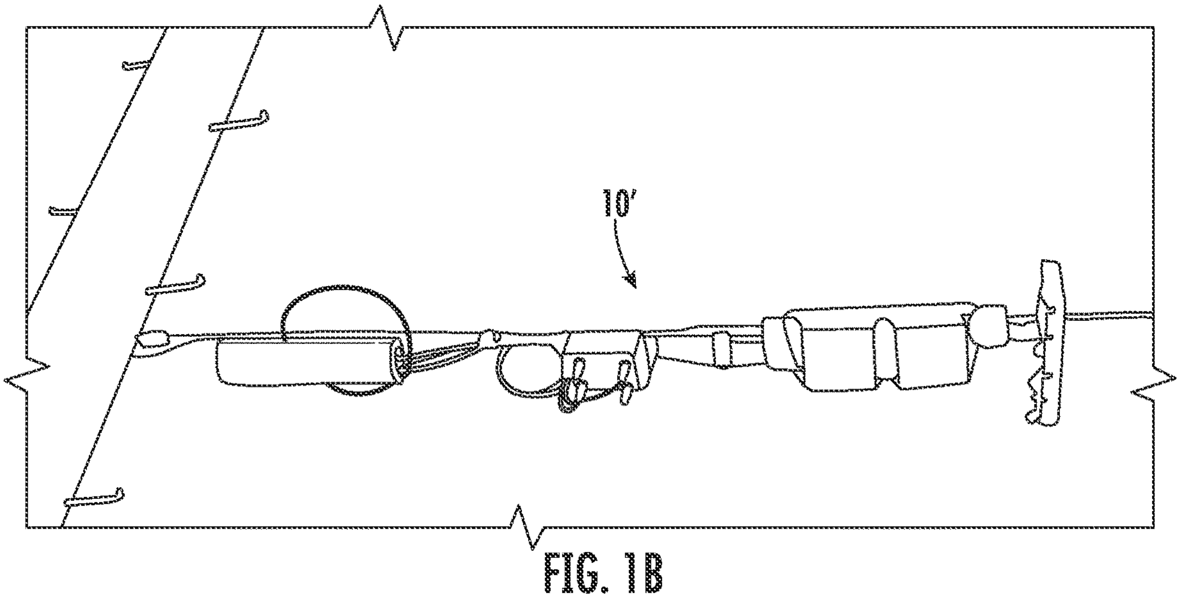
FIG. 1B PRIOR ART

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10"').

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, strand mounts are provided that may provide the dual capability to mount one or more small cell radios (and/or antennas or other telecommunications equipment) either on a cable strand or on a mounting structure (e.g., a pole). Alternative strand mount and strand mount assemblies are also provided. Embodiments of the present invention will now be discussed in greater detail with reference to FIGS. 2-16B.

Figure 2:
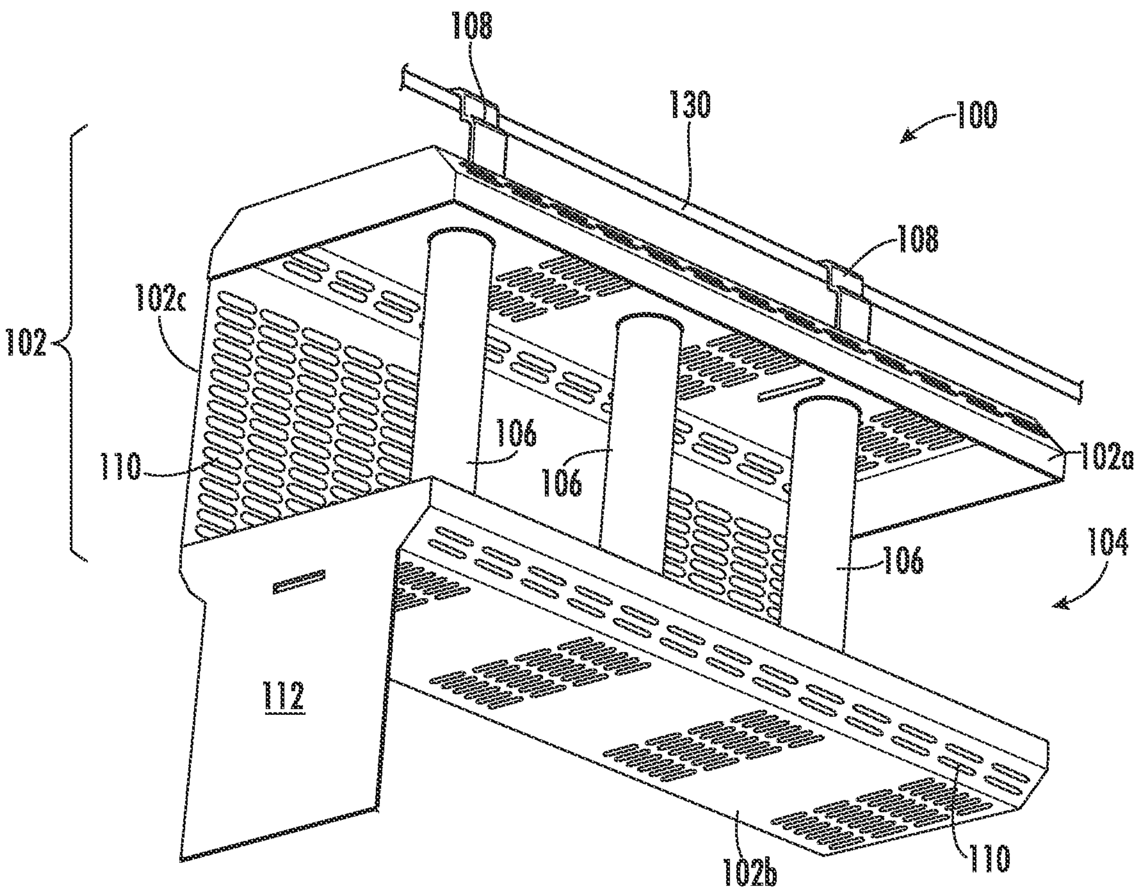
FIG. 2 is a bottom perspective view of a strand mount according to embodiments of the present invention.
Figure 3A:
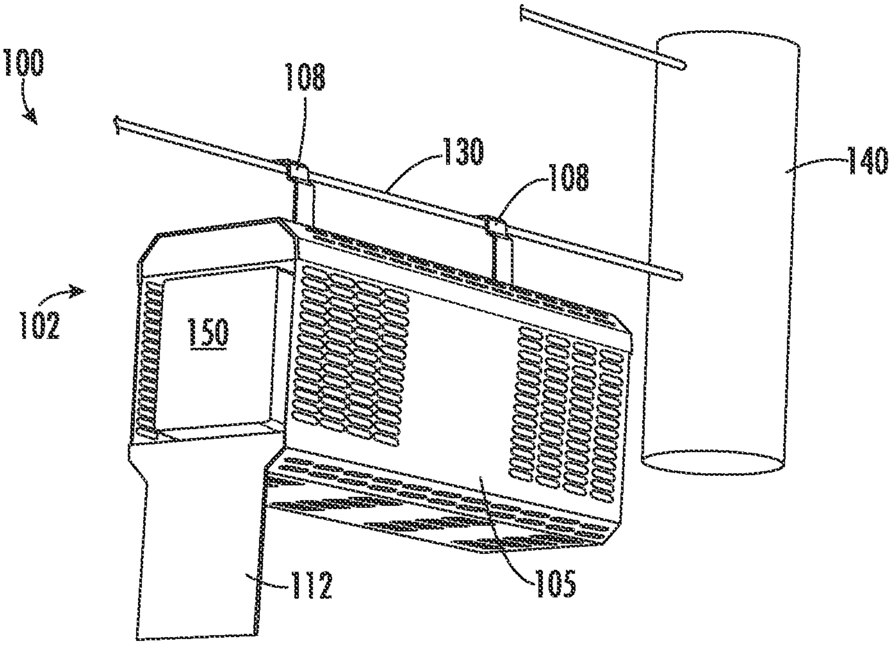
FIG. 3A is a perspective view of the strand mount of FIG. 2 mounted on a cable strand that is in turn mounted to a pole, wherein equipment is installed within the strand mount.
Figure 3B:
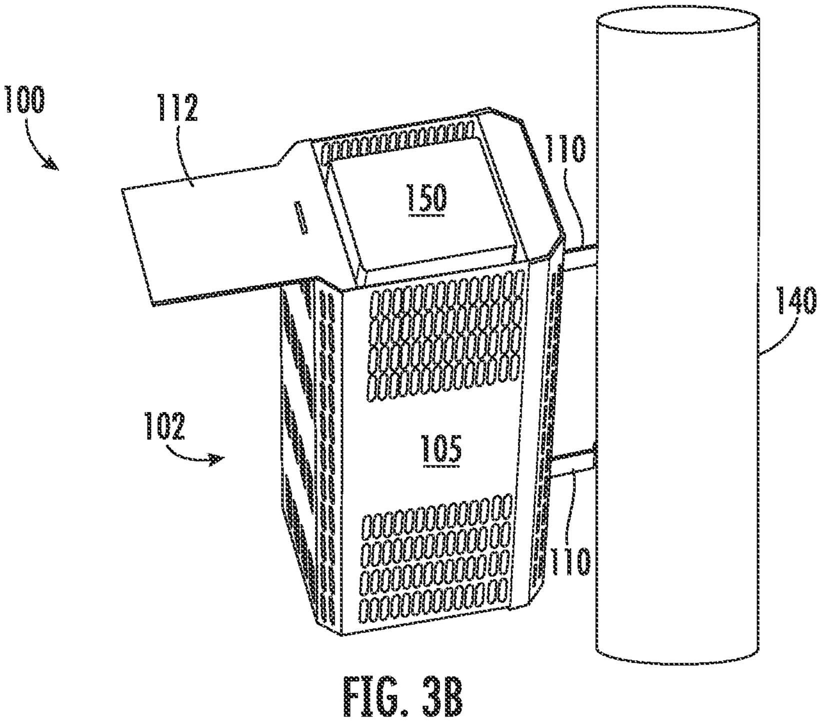
FIG. 3B is a bottom perspective view of the strand mount and equipment of FIG. 3A vertically mounted directly onto a pole without an intervening cable strand.

Referring to FIG. 2 and FIGS. 3A-3B, a strand mount 100 according to embodiments of the present invention is illustrated. The strand mount 100 may include a top plate 102*a*, a bottom plate 102*b*, and opposing side plates 102*c*. Together the top plate 102*a*, bottom plate 102*b*, and side plates 102*c* form a housing 102 (e.g., a semi-shroud) of the mount 100. The top, bottom, and side plate 102*a*-*c* may provide structural support to the mount 100. The housing 102 of the mount 100 has an interior cavity 104 that is dimensioned to fit around one or more small cell radios 150, antenna 160 and/or other related telecommunications equipment (see, e.g., FIGS. 3A-3B). The "semi-shrouded" design of the strand mount 100 of the present invention may allow for easy installation and less burdensome serviceability of the one or more pieces of telecommunications equipment (i.e., radios 150 and/or antennas 160) mounted thereto. In some embodiments, the strand mount 100 may further include a housing cover 105 may be placed around the housing 102 to further protect any telecommunications equipment 150, 160 that may be secured to the mount 100.

In some embodiments, the strand mount 100 includes a plurality of mounting members 106. In some embodiments, the mounting members 106 may comprise pipes. For example, in some embodiments, the strand mount 100 may include three mounting pipes 106 located within the interior cavity 104 of the housing 102 (see, e.g., FIG. 2). The ends of each mounting member 106 may be secured to the top and bottom plates 102*a*, 102*b*, respectively, of the mount 100 and may provide further structural support to the strand mount 100. In addition, each mounting member 106 is configured such that one or more small cell radios 150 or antennas 160 can be mounted thereto (see, e.g., FIGS. 3A-3B). Each mounting member 106 may also be configured such that other telecommunications equipment, e.g., diplexers, can be mounted thereto. In some embodiments, the radios 150 or antennas 160 may be secured directly to the mounting members 106 by bands or other similar fasteners. In some embodiments, the inclusion of an antenna bracket (not shown) may be required to allow for azimuth adjustments, for example, when an antenna 160 is secured to the strand mount 100.

The strand mount 100 of the present invention further includes one or more mounting brackets 108. In some embodiments, the strand mount 100 has the dual capability of being mountable on either a cable strand 130 or a pole 140 (or other mounting structure). For example, as shown in FIG. 3A, in some embodiments, one or more mounting brackets 108 may be configured to hang (and secure) the strand mount 100 on a cable strand 130 (e.g., the mount 100 may be mounted horizontally, or parallel, in relation to a ground surface). As shown in FIG. 3B, in some embodiments, the same mounting brackets 108, in combination with one or more reinforcing mounting brackets 110, may be configured to mount the strand mount 100 to a pole 140 or other mounting structure (e.g., the mount 100 may be mounted vertically, or perpendicular, in relation to the ground surface). In some embodiments, the mounting brackets 108 may be removed and replaced with the reinforcing mounting bracket 110 (or similar mounting bracket) that is configured to attach the strand mount 100 to a pole 140 (or other mounting structure, e.g., a building) and reinforce the connection surface between the strand mount 100 and the pole 140. Thus, the strand mount 100 of the present invention could allow telecommunications carriers to purchase one strand mount 100 for small cell radios 150 and/or antennas 160 that fulfills both deployment types (i.e., horizontal mounting to a cable strand 130 and vertical mounting to a pole 140).

In some embodiments, the housing 102 and/or housing cover 105 of the strand mount 100 may include perforations 110 (e.g., ventilation holes or slots). For example, in some embodiments, the perforations 110 may be located in at least one of the top plate 102*a*, the bottom plate 102*b*, and/or side plates 102*c* of the mount 100. Small cell radios 150 and antennas 160 typically generate heat during operation. When radios/antennas 150, 160 are mounted within the interior cavity 104 of the mount 100, the perforations 110 in the housing 102 can allow some of the heat generated by the radios/antennas 150, 160 to escape and also allow air to circulate through the mount 100, thereby helping to prevent the radios/antennas 150, 160 from overheating. The perforations 110 can also help to reduce the overall weight of the mount 100, again making installation less burdensome and reducing costs.

In some embodiments, the strand mount 100 of the present invention may further include an external mounting plate 112. The external mounting plate 112 may extend outwardly from an edge of the top plate 102*a* or bottom plate 102*b*. The external mounting plate 112 may be configured such that one or more additional small cell radios 150, antennas 160, or other telecommunications equipment can be mounted to the mount 100.

Figure 4A:
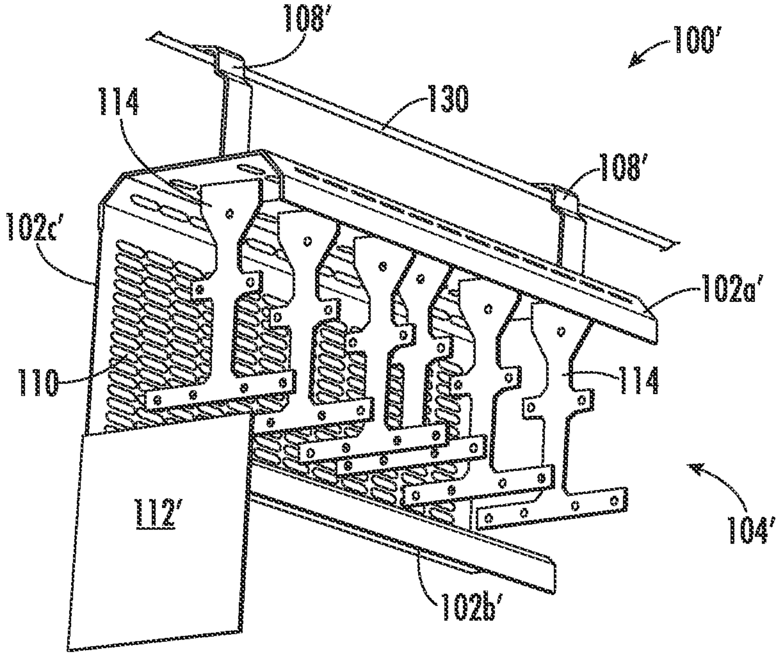
FIG. 4A is a bottom perspective view of an alternative strand mount according to embodiments of the present invention.
Figure 4B:
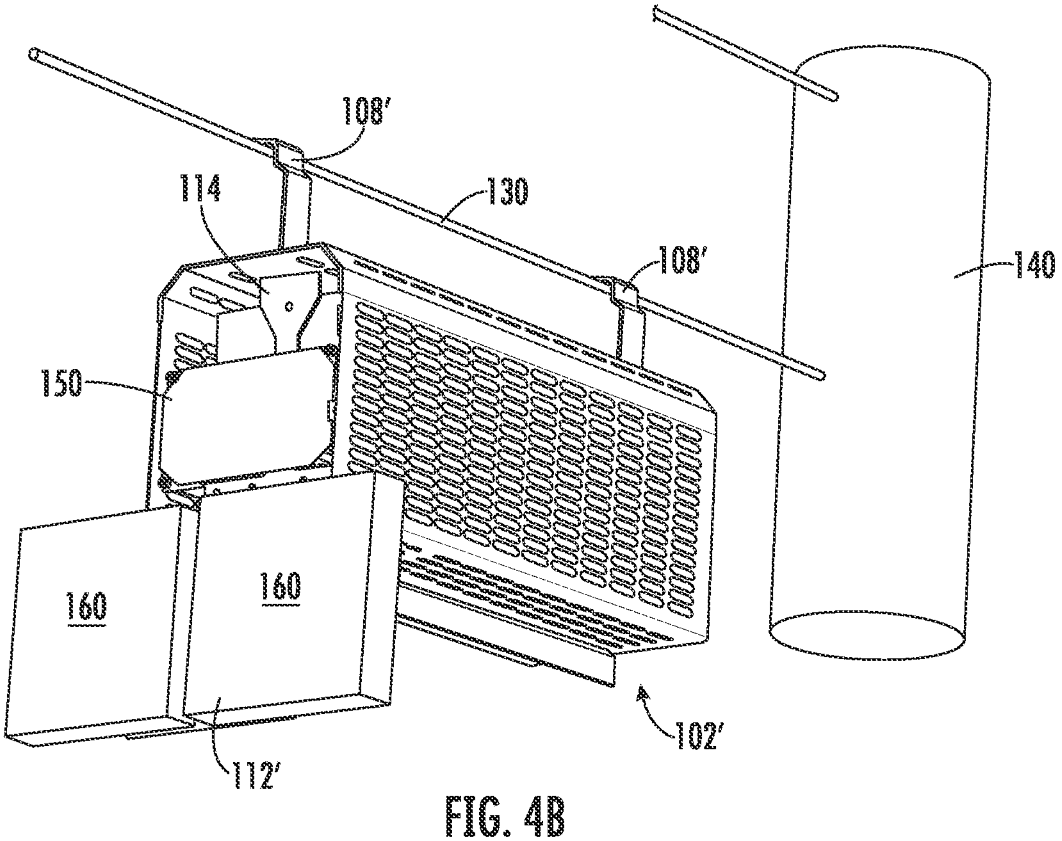
FIG. 4B is a top perspective view of the strand mount of FIG. 4A mounted on a cable strand that is mounted to a pole, wherein equipment is installed within the strand mount.

Referring to FIGS. 4A-4B, an alternative strand mount 100' according to embodiments of the present invention is illustrated. As shown in FIG. 4A, similar to the strand mount 100 described above, the strand mount 100' includes a top plate 102*a*', a bottom plate 102*b*', and opposing side plates 102*c*', wherein at least one of the plates 102*a-c*' include perforations 110 for ventilation. Together the top plate 102*a*', bottom plate 102*b*', and side plates 102*c*' form the housing 102' of the mount 100'. The housing 102' of the mount 100' has an interior cavity 104' that is dimensioned to fit around one or more small cell radios 150, antennas 160, and/or other telecommunications equipment) (see, e.g., FIG. 4B).

The strand mount 100' differs from mount 100 described herein by how the one or more small cell radios/antennas 150, 160 are mounted within the interior cavity 104' of the housing 102'. As shown in FIG. 4A, in some embodiments, the mounting members 106 of the strand mount 100' may comprise a plurality of mounting arms 114. The mounting arms 114 may be attached to an inner surface of the top plate 102*a*' and extend downwardly into the interior cavity 104' of the mount 100'. Each mounting arm 114 may be configured such that a small cell radio 150 (or antenna 160 or other related telecommunications equipment, such as, diplexers and pod-8 devices) can be mounted thereto (see, e.g., FIG. 4B). In some embodiments, the mounting arms 114 may be removably attached to the top plate 102*a*', thereby allowing for easy installation and less burdensome serviceability of the one or more pieces of telecommunications equipment (i.e., radios and/or antennas 150, 160).

Similar to the strand mount 100 described in, the mount 100' includes one or more mounting brackets 108'. As shown in FIGS. 4A-4B, the mounting brackets 108' are configured to hang (and secure) the strand mount 100' on a cable strand 130 (e.g., mounted horizontally). The strand mount 100' may further include an external mounting plate 112 that extends outwardly from an edge of the top plate 102*a*' or bottom plate 102*b*'. As shown in FIG. 4B, the external mounting plate 112' may be configured such that one or more additional small cell radios/antennas 150, 160 (or other telecommunications equipment) can be mounted to the strand mount 100'.

Figure 5A:
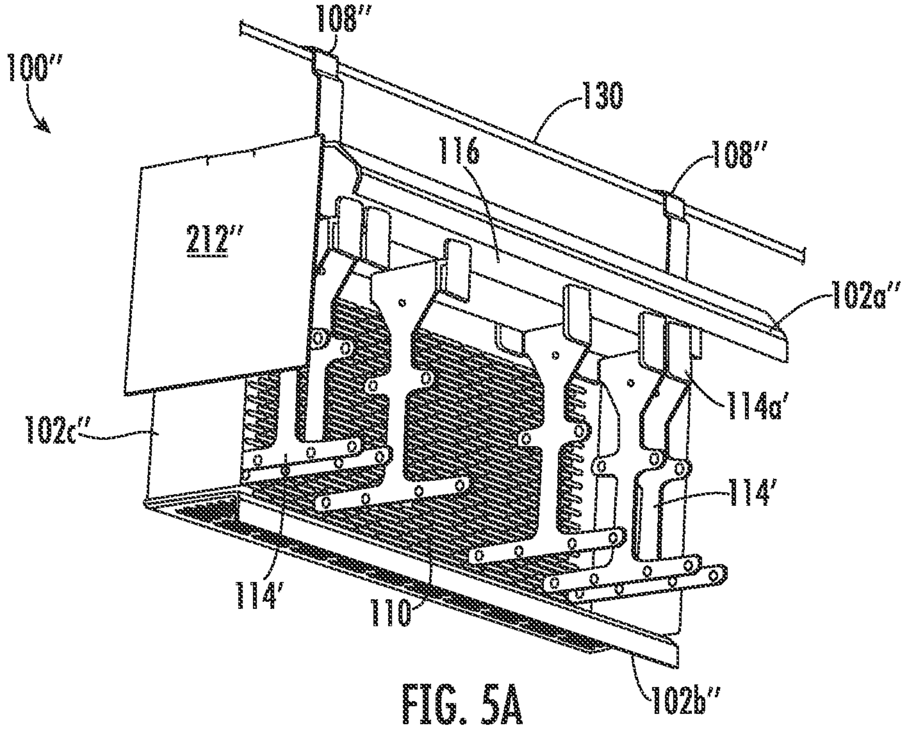
FIG. 5A is a bottom perspective view of an alternative strand mount according to embodiments of the present invention.
Figure 5B:
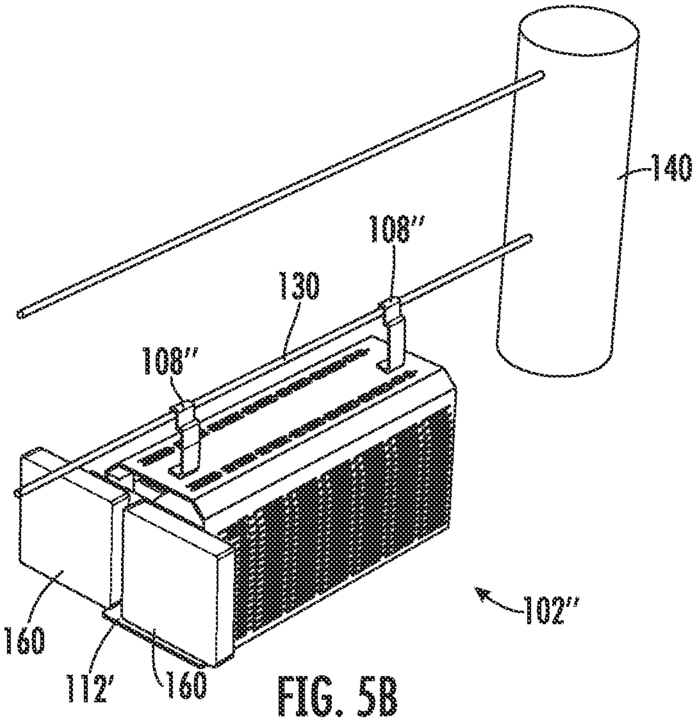
FIG. 5B is a bottom perspective view of the strand mount of FIG. 5A mounted on a cable strand that is mounted to a pole, wherein equipment is installed within the strand mount.

Referring to FIGS. 5A-5B, an alternative strand mount 100" according to embodiments of the present invention is illustrated. The strand mount 100" is similar to the strand mounts 100' described herein. The strand mount 100" differs from the mount 100' by the manner in which each of the mounting members (i.e., mounting arms 114') is attached to the mount 100". As shown in FIG. 5A, in some embodiments, a strand mount 100" of the present invention may further include a support member 116. The support member 116 may be coupled to or integral with an inner surface of the top plate 102*a*" of the mount 100" and may extend longitudinally down the center of the top plate 102*a*". The mounting arms 114' are attached to the support member 116 and extend downwardly into the interior cavity 104" of the mount 100". In some embodiments, the mounting arms 114' may have extension flanges 114*a*' that are configured to latch or hook onto the support member 116. The extension flanges 114*a*' may allow the mounting arms 114' to be removably attached to the support member 116. Thus, the configuration of the mounting arms 114' may allow for easy installation and less burdensome serviceability of the one or more small cell radios 150 and/or antennas 160.

Figure 6A:
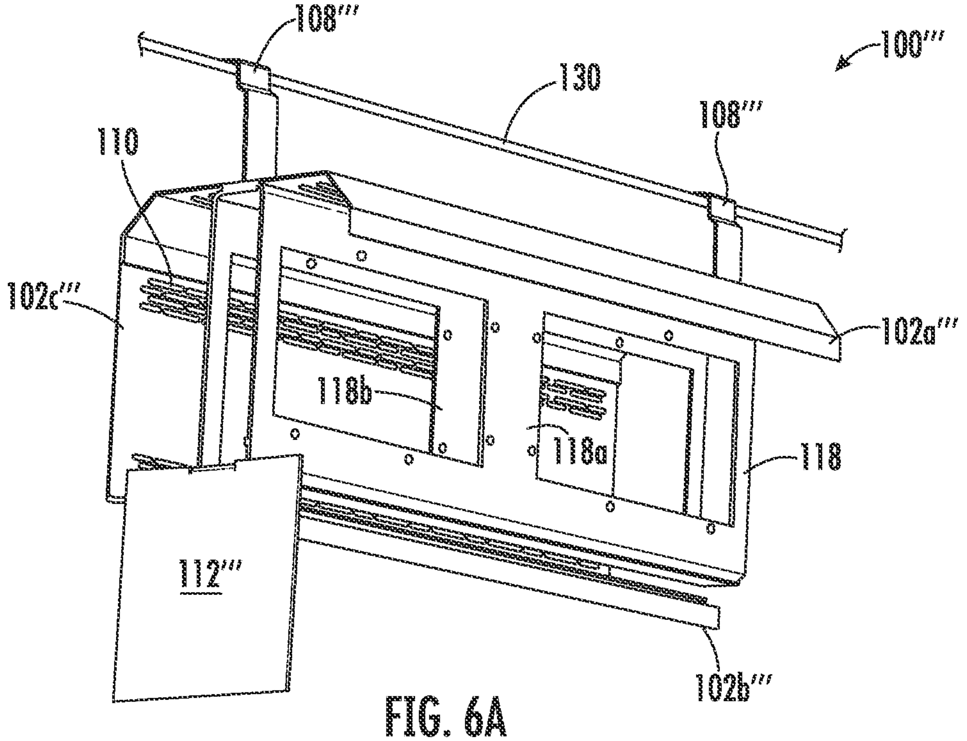
FIG. 6A is a bottom perspective view of an alternative strand mount according to embodiments of the present invention.
Figure 6B:
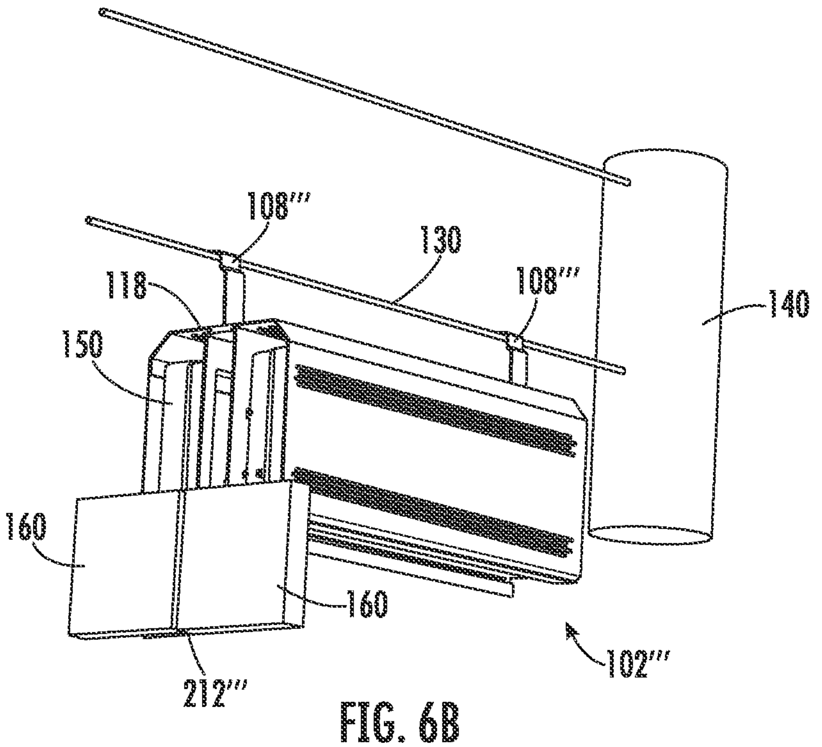
FIG. 6B is a bottom perspective view of the strand mount of FIG. 6A mounted on a cable strand that is mounted to a pole, wherein equipment is installed within the strand mount.

Referring to FIGS. 6A-6B, an alternative strand mount 100'" according to embodiments of the present invention is illustrated. The strand mount 100'" is similar to the strand mounts 100', 100" described herein. The strand mount 100'" includes a top plate 102*a*'", a bottom plate 102*b*'", and opposing side plates 102*c*'" where at least one of the plates 102*a-c*'" include perforations 110 for ventilation. Together the top plate 102*a*'", bottom plate 102*b*'", and side plates 102*c*'" form the housing 102'" of the mount 100'". The housing 102'" of the mount 100'" has an interior cavity 104'" that is dimensioned to fit around one or more small cell radios 150, antennas 160, or other telecommunications equipment (see, e.g., FIG. 6B).

The strand mount 100'" differs from the other strand mounts 100', 100" described herein by the manner in which the one or more small cell radios/antennas 150, 160 are mounted within the interior cavity 104'" of the housing 102'". As shown in FIG. 6A, in some embodiments, the strand mount 100'" may include a center mounting frame 118. The mounting frame 118 is attached to an inner surface of the top plate 102*a*'" and extends downwardly into the interior cavity 104'". The mounting frame 118 has opposing sides 118*a*, 118*b* that are each configured such that one or more small cell radios 150, antennas 160, and/or other telecommunications equipment may be mounted thereto.

In some embodiments, the mount 100'" includes one or more mounting brackets 108'". As shown in FIGS. 6A-6B, the mounting brackets 108'" are configured to hang (and secure) the strand mount 100'" on a cable strand 130 (e.g., mounted horizontally). The strand mount 100'" may further include an external mounting plate 112 that extends outwardly from an edge of the center mounting frame 118 (see, e.g., FIG. 6A). In some embodiments, the external mounting plate 112'" may extend from an edge of the top or bottom plate 102*a*'", 102*b*'". As shown in FIG. 6B, in some embodiments, the mounting plate 112'" may be configured such that one or more additional small cell radios/antennas 150, 160 (or other telecommunications equipment) can be mounted to the mount 100'".

Figure 7A:
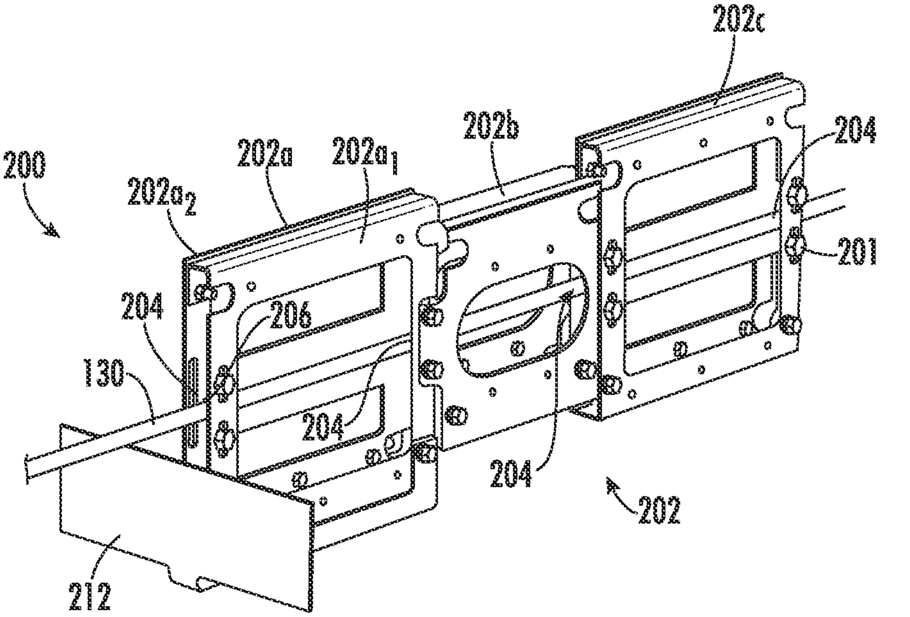
FIG. 7A is a perspective view of an alternative strand mount according to embodiments of the present invention.
Figure 7B:
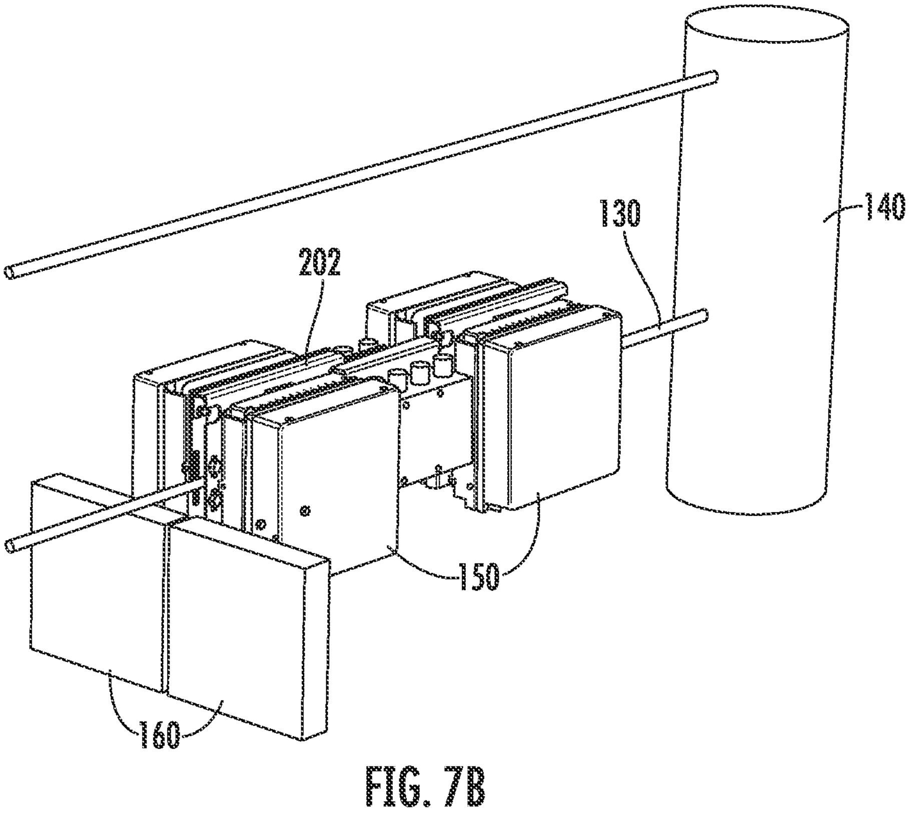
FIG. 7B is a perspective view of the strand mount of FIG. 7A mounted on a cable strand that is mounted to a pole, wherein equipment is installed onto the strand mount.

Referring now to FIGS. 7A-7B, an alternative strand mount 200 according to embodiments of the present invention is illustrated. The strand mount 200 includes a frame 202 comprising two or more interconnected frame sections (e.g., 202*a-c* in FIG. 7A). As shown in FIG. 7A, in some embodiments, the strand mount 200 may include three interconnected frame sections 202*a-c*. In some embodiments, the interconnected frame sections 202*a-c* may also be secured together via bolts 201 to form the frame 202 of the mount 200. However, other known methods may be used to secure the frame sections 202*a-c* (and halves) together, such as, welding. The individual frame sections 202*a-c* can vary in size or dimensions to accommodate different types of small cell radios 150, antennas 160, and related telecommunications equipment. For example, as shown in FIG. 7A, in some embodiments, the middle frame section 202*b* may be smaller than the two outer frames sections 202*a*, 202*c*.

The frame sections 202*a-c* have opposing sides (e.g., $\mathbf{202}a_1$, $\mathbf{202}a_2$, $\mathbf{202}b_1$, $\mathbf{202}b_2$, $\mathbf{202}c_1$, $\mathbf{202}c_2$) that are configured such that one or more small cell radios 150, antennas 160, and/or other telecommunications equipment may be mounted thereto. In some embodiments, each frame section 202*a-c* also comprises mounting apertures 204 sized and configured to receive a cable strand 130. In some embodiments, the opposing sides (e.g., $\mathbf{202}a_1$, $\mathbf{202}a_2$) are separable and may be secured together via bolts 201 to form each frame section 202*a-c*. In some embodiments, one side of one or more of the frame sections 202*a-c* may comprise a clamp 206 or other fastener configured to mount to a cable strand 130.

As shown in FIG. 7A, the mounting apertures 204 are located generally in the center of the right and left sides of each frame section 202*a-c* (e.g., when viewed from the orientation of the mount 200 shown in FIGS. 7A-7B). The mounting apertures 204 of each frame section 202*a-c* are aligned with the mounting apertures 204 of the adjacent frame section 202*a-c* to create an unimpeded opening through the frame 202 (i.e., the mounting apertures 204 are collinear with the other mounting apertures 204). This configuration allows a cable strand 130 to extend through the frame 202 of the mount 200 (i.e., through each mounting aperture 204), thereby mounting the strand mount 200 on the cable strand 130.

In some embodiments, to install the strand mount 200 on a pre-existing cable strand 130, the side of the mount 200 that includes the clamps 206 (or similar fasteners) is first secured on the cable strand 130. Next, the opposing side of the mount 200 is secured to the first side of the mount 200 (e.g., via bolts 201) thereby securing the cable strand 130 in-between the two sides of the mount 200. Twisting or rotation of the strand mount 100 on the cable strand 130 is mitigated through gravitational orientation of the mount 100 on the cable strand 130. The mount 100 has limited adjustable up and down movement which helps to prevent the cable strand 130 from sitting on the balance point of the mount 100.

In some embodiments, the strand mount 200 may further include an external mounting plate 212 that may be coupled to one of the outer frame sections (e.g., 202*a*, 202*c*). As shown in FIG. 7B, the mounting plate 212 may be configured such that one or more additional small cell radios 150, antennas 160, and/or other telecommunications equipment can be mounted to the mount 200.

Figure 8A:
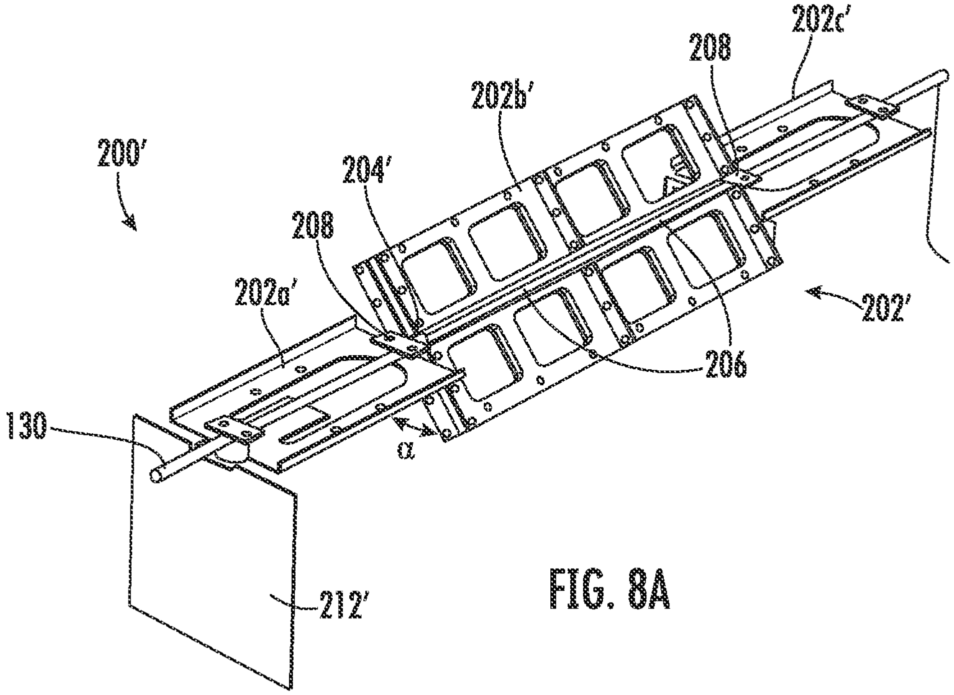
FIG. 8A is a perspective view of an alternative strand mount according to embodiments of the present invention.
Figure 8B:
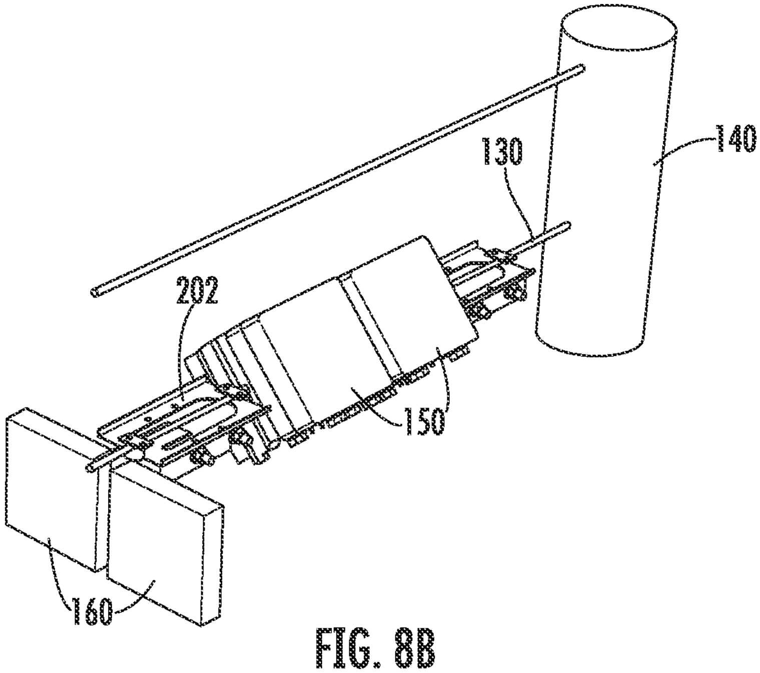
FIG. 8B is a perspective view of the strand mount of FIG. 8A mounted on a cable strand that is mounted to a pole, wherein equipment is installed onto the strand mount.

As shown in FIGS. 7A-7B, when the strand mount 200 is mounted on a cable strand 130, the frame 202 of the mount 200 is perpendicular to a ground surface. Referring now to FIGS. 8A-8B, an alternative strand mount 200' according to embodiments of the present invention is illustrated which allows at least one of the frame sections (e.g., 202*b*') to be adjusted to a desired tilt angle α for a mounted small cell radio 150 and/or antenna 160.

Similar to mount 200, the strand mount 200' includes a frame 202' comprising two or more interconnected frame sections (e.g., 202*a-c*'). In some embodiments, the strand mount 200' may include three interconnected frame sections 202*a-c*'. The frame sections 202*a-c*' are configured such that one or more small cell radios 150 (or other telecommunications equipment) may be mounted thereto. As shown in FIG. 8A, the outer frame sections 202*a*', 202*c*' are parallel to a ground surface and are locked in that configuration. However, in some embodiments, the middle frame section 202*b*' may be adjustable (rotatable) on the cable strand 130 relative to the outer frame sections 202*a*', 202*c*'. Similar to the frame sections 202*a-c* of mount 200 described herein, the frame sections 202*a-c*' of mount 200' comprise mounting apertures 204' sized and configured to receive a cable strand 130 which allows a cable strand 130 to extend through the frame 202 of the mount 200, thereby mounting the strand mount 200' on the cable strand 130.

In some embodiments, the middle frame section 202*b*' may comprise a tubular member 206 sized to receive the cable strand 130. The tubular member 206 may be configured such that the middle frame section 202*b*' is able to rotate about the cable strand 130 while remaining mounted on the cable strand 130. This allows the middle frame section 202*b*' (and one or more small cell radios 150 and/or antennas 160 mounted thereto) to be adjusted (tilted) to a desired angle α. In some embodiments, the mount 200' further includes a locking mechanism 208 configured to lock the middle frame section 202*b*' at a desired tilt angle α. Additionally, the locking mechanism(s) 208 provide some force that may help to prevent the mount 200' from swaying on the cable strand 130.

In some embodiments, the strand mount 200' may further include a mounting plate 212' that may be coupled to one of the outer frame sections (e.g., 202*a*', 202*c*'). As shown in FIG. 8B, in some embodiments, the mounting plate 212' may be configured such that one or more additional small cell radios 150, antennas 160, and/or other telecommunications equipment can be mounted to the mount 200'. In some embodiments, the frame sections 202*a*', 202*c*' that reside on top of the cable strand 130 in addition to the mounting plate 212', gravitationally align with one another, while the radio/antenna portion (e.g., frame section 202*b*') places the cable strand 130 directly on the balance point of the tray. This may allow the downward orientation of frame sections 202*a*', 202*c*' to maintain the tilt angle α of the middle frame section 202*b*'. The angle α is also unique as it may drastically reduce the effective projected area (EPA) of the mount 200', thereby allowing for higher wind loading easier to achieve.

Referring now to FIGS. 9A-9D, an alternative strand mount 200" according to embodiments of the present invention is illustrated. The strand mount 200" includes a frame 202 comprising two opposing side panels 202*a*", 202*b*". The side panels 202*a*", 202*b*" are configured such that a small cell radio 150 and/or antenna 160 can be mounted thereon. Each side panel 202*a*", 202*b*" may comprise a plurality of slots 203 configured such that different sizes/types of radios 150 or antennas 160 may be secured to the mount 200". The strand mount 200" also includes a plurality of mounting clamps 208" that are each configured to secure and lock the strand mount 200" to a cable strand 130. The side panels 202*a*", 202*b*" are secured to the mounting clamps 208" via bolts 210*a*. In some embodiments, the side panels 202*a*", 202*b*" may comprise a plurality of elongated slots 210 that are each configured to receive the bolts 210*a*. The elongated slots 210 may allow the side panels 202*a*", 202*b*" to be raised or lowered relative to the mounting clamps 208" to assist in balancing the strand mount 200" on a cable strand 130 (e.g., when different size/types of radios 150 and/or antennas 160 are mounted on the side panels 202*a*", 202*b*").

In some embodiments, the mounting clamps 208" may each comprise two plates 208*a*, 208*b* that are held together by two or more bolts 207*a*. The two plates 208*a*, 208*b* of each mounting clamp 208" are configured to clamp and secure a cable strand 130 there between when the strand mount 200" is installed on a cable strand 130 (see, e.g., FIGS. 9B and 9D). In some embodiments, the plates 208*a*, 208*b* may comprise a plurality of slots 207 configured to receive the bolts 207*a*. The slots 207 allow the mounting clamps 208" to be adjustable, for example, to accommodate for different size cable strands 130 and to assist with balancing the strand mount 200" on the cable strand 130.

Figure 9A:
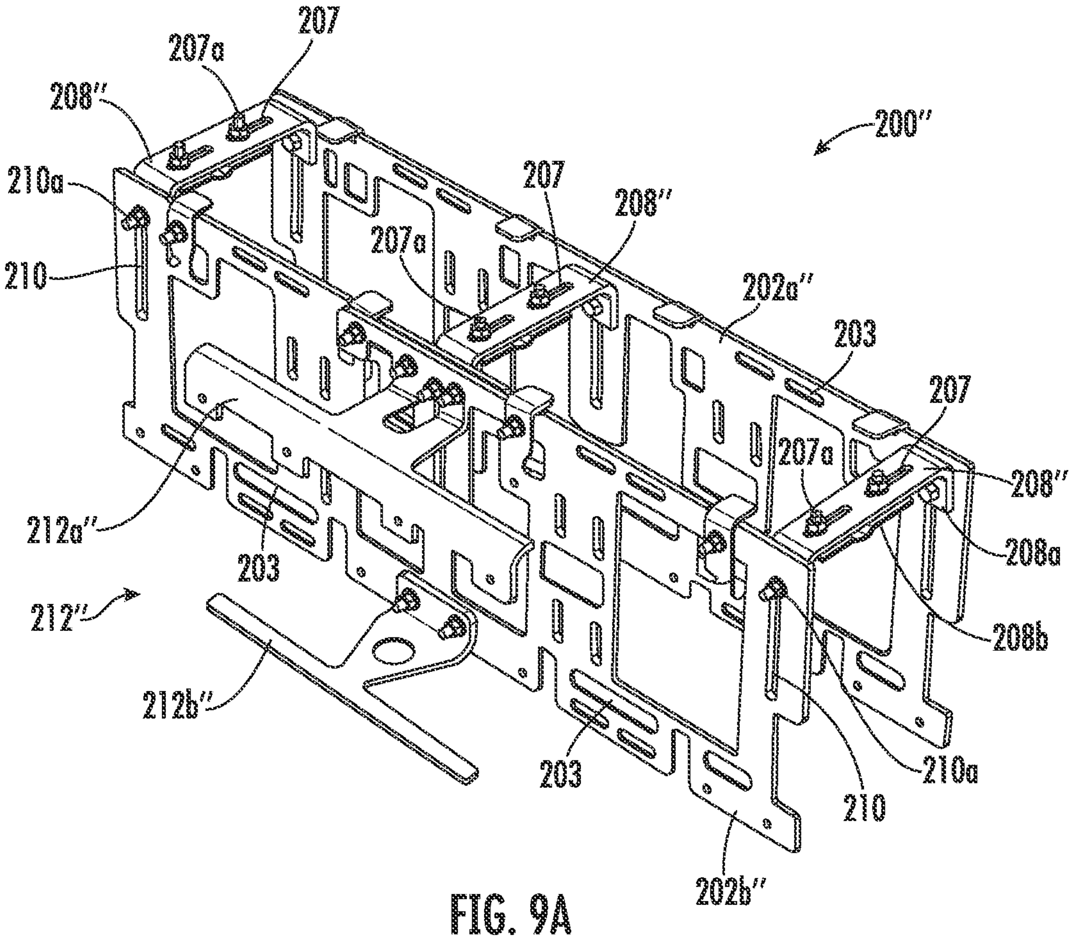
FIG. 9A is a perspective view of an alternative strand mount according to embodiments of the present invention.
Figure 9B:
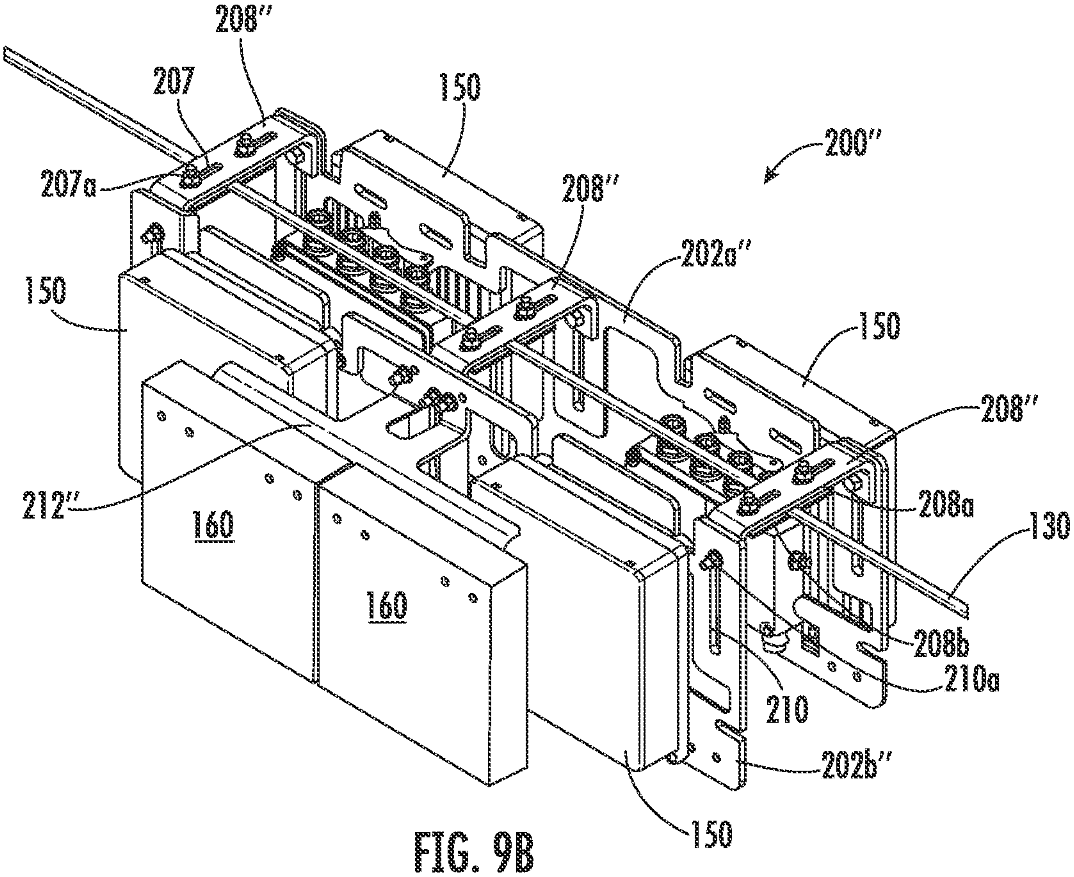
FIG. 9B is a perspective view of the strand mount of FIG. 9A mounted on a cable strand, wherein equipment is installed on the side of the mount.
Figure 9C:
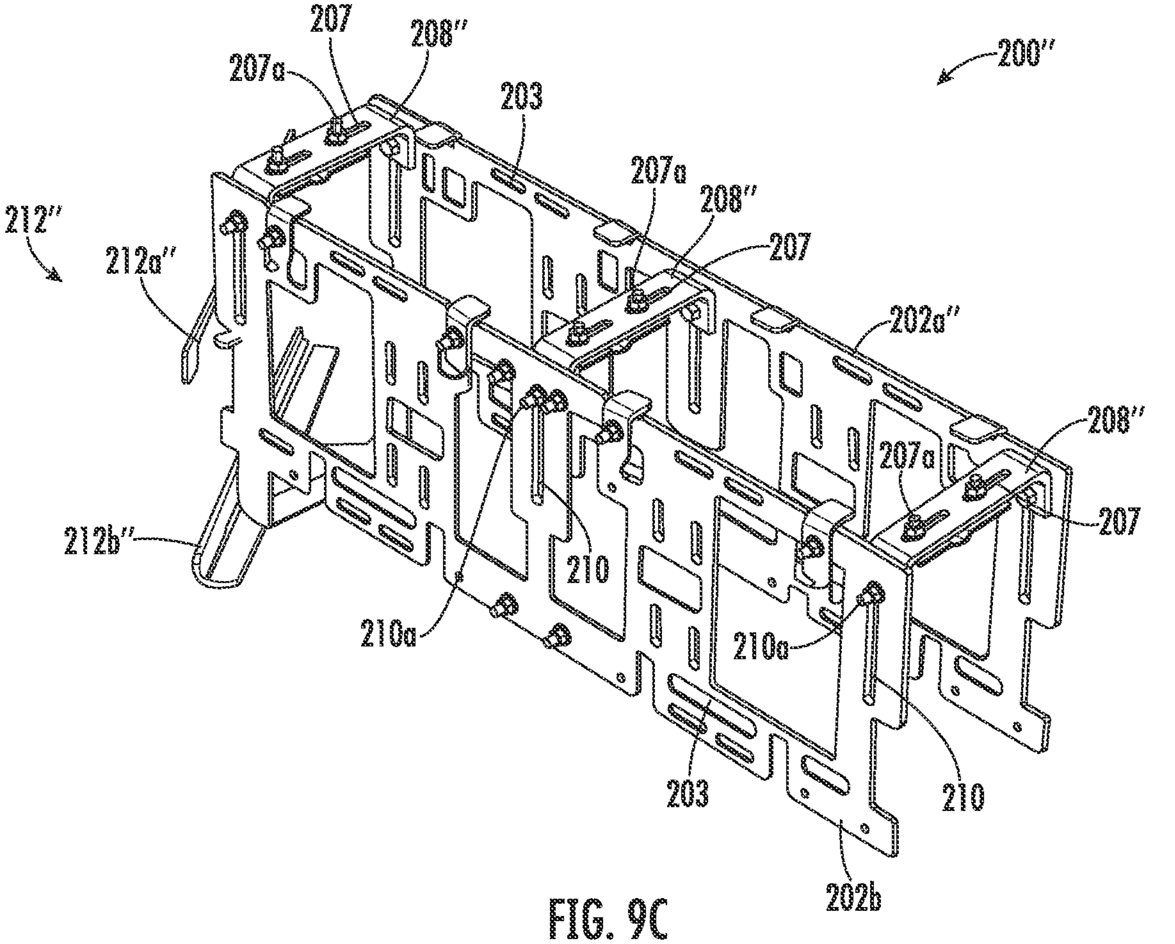
FIG. 9C is a perspective view of the strand mount of FIG. 9A that allows for additional equipment to be installed on an end of the mount.
Figure 9D:
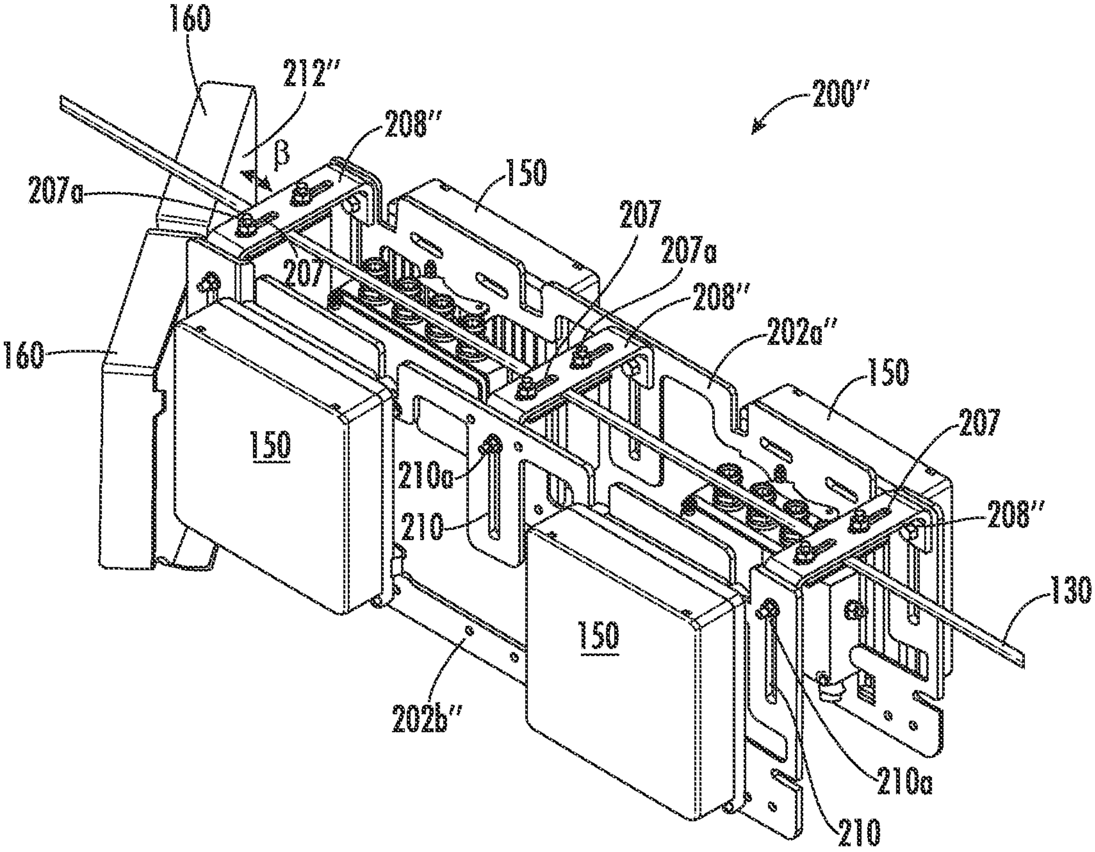
FIG. 9D is a perspective view of the strand mount of FIG. 9C mounted on a cable strand, wherein additional equipment is installed an end of the mount.

In some embodiments, the strand mount 200" may further include an extension or additional mounting plate 212". The mounting plate 212" is configured such that one or more small cell radios 150 and/or antennas 160 can be mounted thereon. In some embodiments, the mounting plate 212" may comprise a top extension 212*a*" and a bottom extension 212*b*". The top extension 212*a*" may be configured such that one or more radios 150 or antennas 160 may be mounted thereon and the bottom extension 212*b*" may provide additional support to the mounted equipment 150, 160. As shown in FIGS. 9A-9B, in some embodiments, the mounting plate 212" may be secured and extends from the side of the strand mount 200". As shown in FIGS. 9C-9D, in some embodiments, the mounting plate 212" may be secured to the end of the strand mount 200". When secured to the end of the strand mount 200", the mounting plate 212" may be secured at an angle (β), for example, to achieve a desired azimuth.

In some embodiments, the strand mount 200" may further include a housing (not shown) that is dimensioned to fit around the one or more radios 150 and/or antennas 160 that are mounted to the strand mount 200". Similar to the strand mounts described herein, the housing for the strand mount 200" may include perforations for ventilation.

Referring now to FIGS. 10-14, alternative strand mounts 300, 300' and strand mount assemblies 400, 400', 400" are illustrated. Properties and/or features of the strand mounts 300, 300' and/or strand mount assemblies 400, 400', 500 may be as described above in reference to FIGS. 2-9D and duplicate discussion thereof may be omitted herein for the purposes of discussing FIGS. 10-14.

Figure 10:
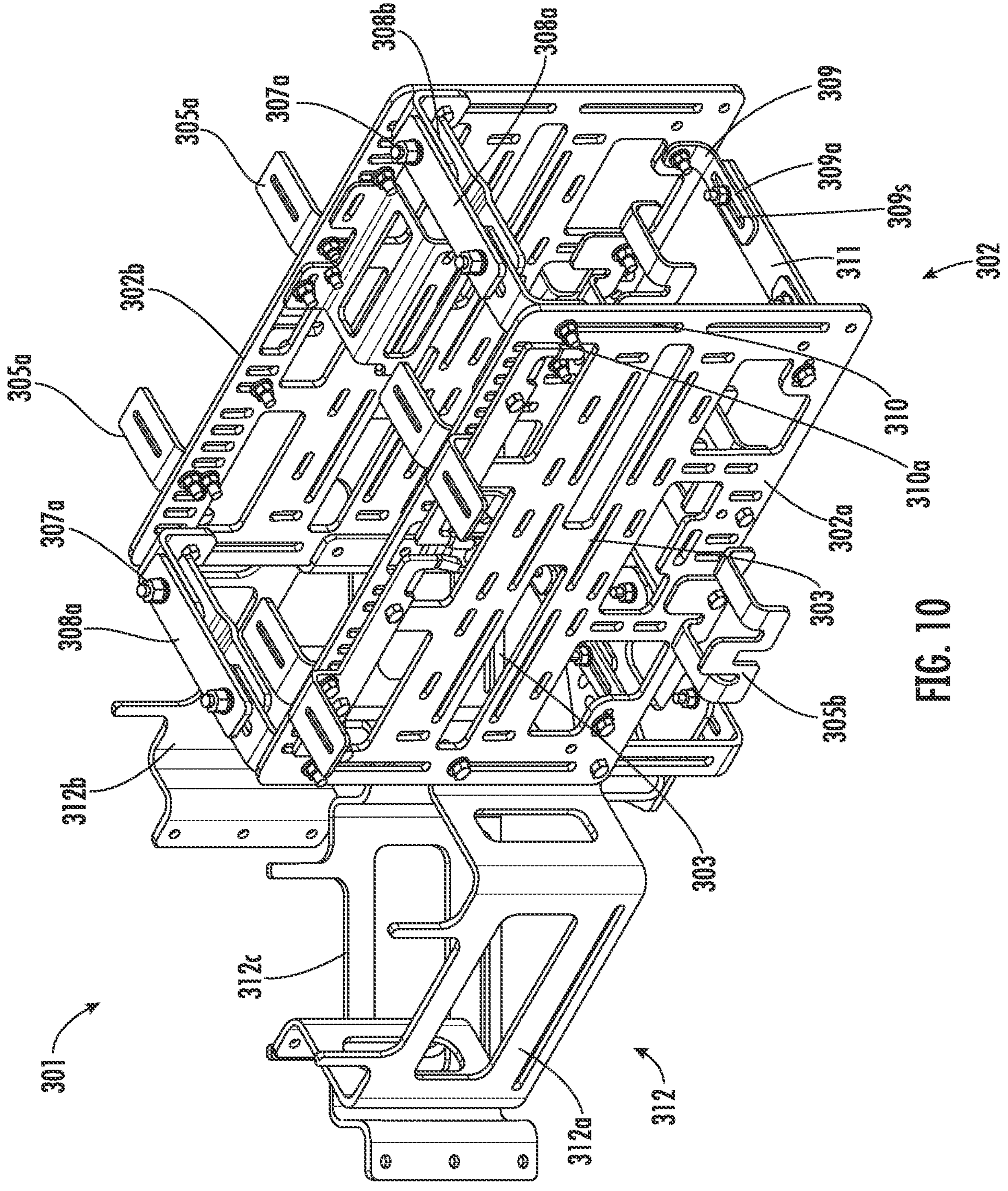
FIG. 10 is a perspective view of a strand mount assembly kit according to embodiments of the present invention, wherein the kit includes the option of a parallel configuration or a rotational configuration.

FIG. 10 illustrates a strand mount assembly kit 301 according to embodiments of the present invention. The strand mount assembly kit 301 may comprise components for a strand mount having a “parallel” configuration (i.e., strand mounts 300, 300') and/or a strand mount having a “rotational” configuration (i.e., strand mount 300"). As used herein, the term “parallel,” when used in reference to the configuration or orientation of the strand mounts, means that all of the antennas secured to the strand mount in a static or fixed position. As used herein, the term “rotational,” when used in reference to the configuration or orientation of the strand mounts, means that the position of at least one of the antennas secured to the strand mount may be rotated or moved in relation to the strand mount, for example, to change the azimuth direction of the antenna(s). The components of these respective strand mounts are described in further detail below with respect to the alternative strand mounts 300, 300', 300" and corresponding strand mount assemblies 400, 400', 500, 600', 600' shown in FIGS. 11A-16B.

Figure 11A:
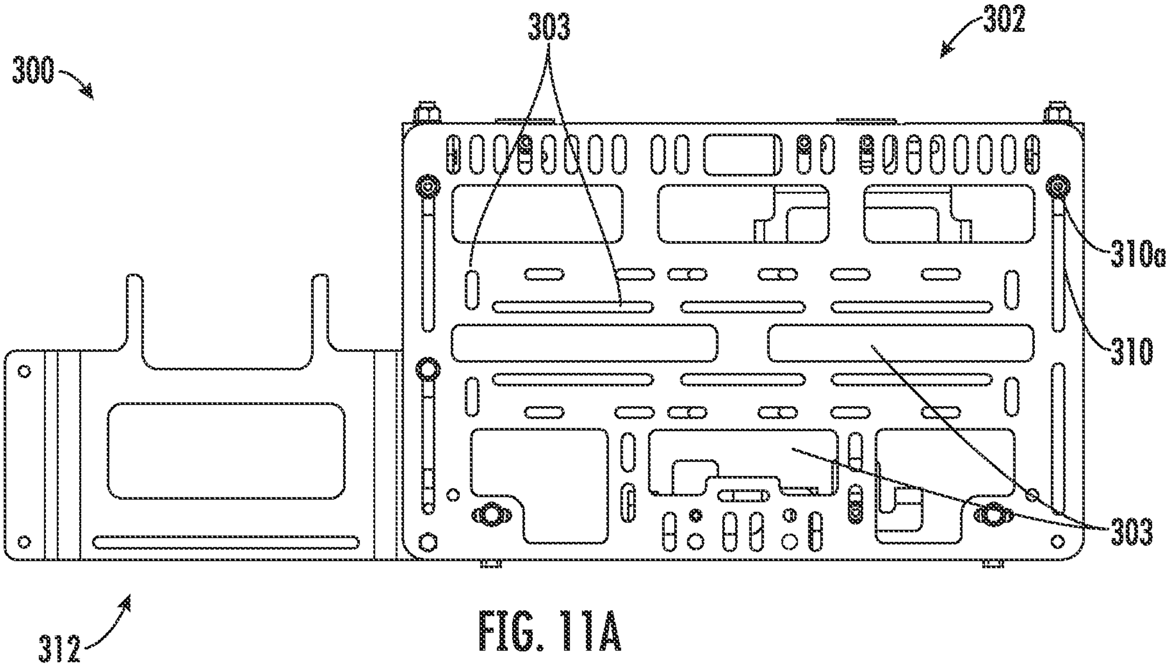
FIG. 11A is a side view of a strand mount having a parallel configuration according to embodiments of the present invention.
Figure 11B:
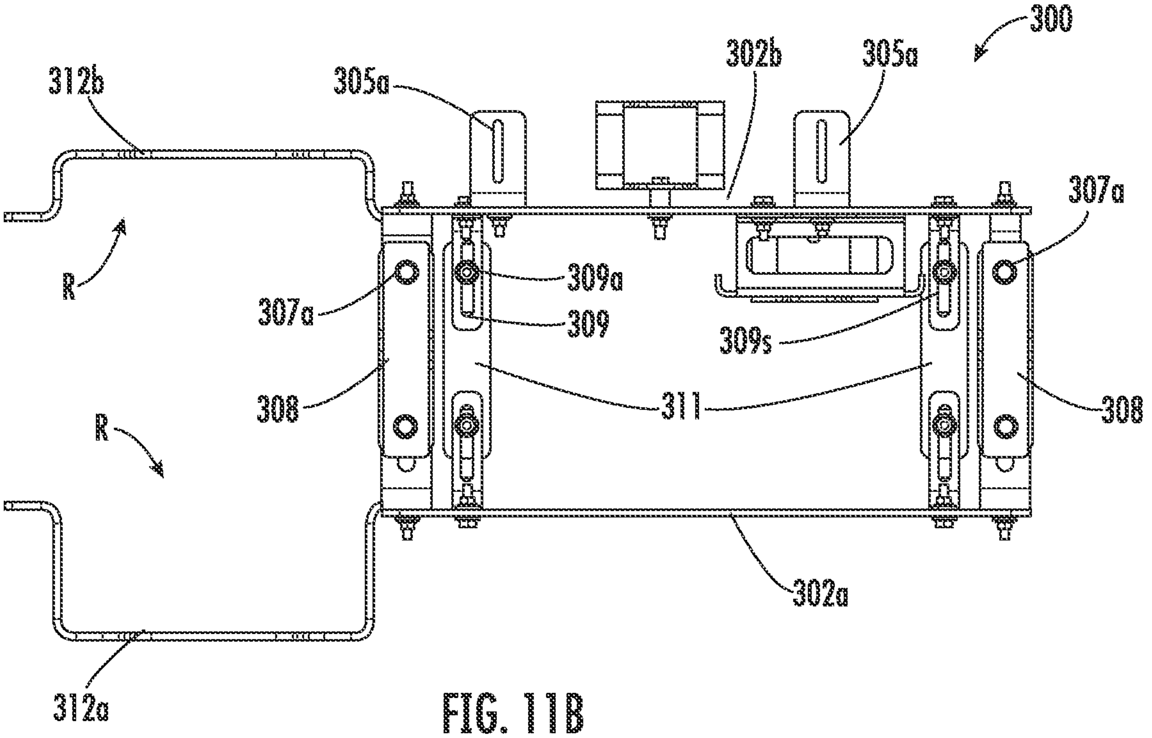
FIG. 11B is a top view of the strand mount of FIG. 11A.
Figure 11C:
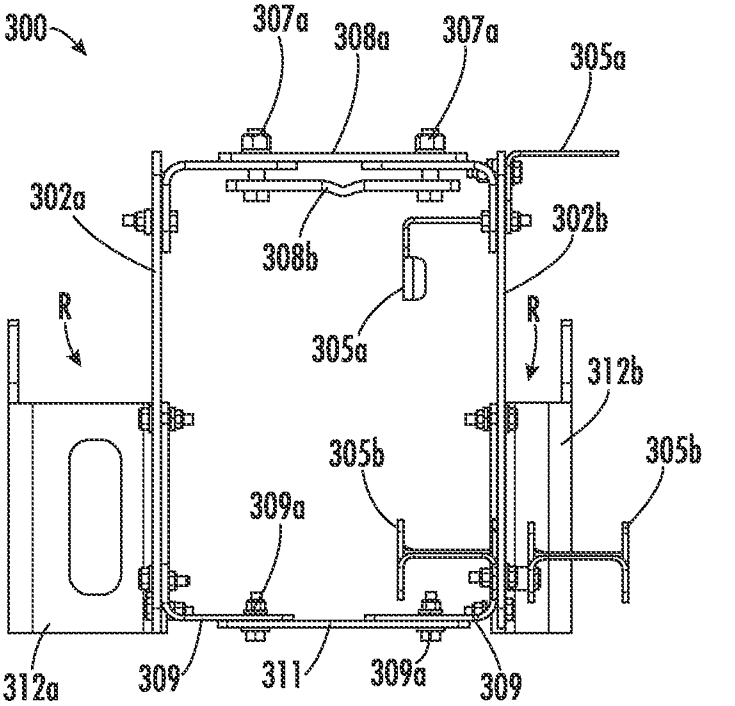
FIG. 11C is an end view of the strand mount of FIG. 11A.

Referring to FIGS. 11A-11C, in some embodiments, the strand mount 300 may include a frame 302 comprising two opposing side panels 302*a*, 302*b*. The side panels 302*a*, 302*b* are configured such that a small cell radio 150, antenna 160, and/or other telecommunications equipment 170 (e.g., diplexer, triplexer, etc.) can be mounted thereon. Each side panel 302*a*, 302*b* may comprise a plurality of perforations or slots 303 configured such that different sizes/types of radios 150 or antennas 160 may be secured to the mount 300. The slots 303 also allow some of the heat generated by the radios/antennas 150, 160 to escape and also allow air to circulate through the mount 300, thereby helping to prevent the radios/antennas 150, 160 from overheating. The slots 303 can also help to reduce the overall weight of the mount 300, making installation less burdensome and reducing costs.

In some embodiments, the strand mount 300 may comprise a plurality of mounting brackets 305a, 305b configured to provide further support to the radios 150, antennas 160 and/or other telecommunications equipment 170 that may be secured to the side panels 302a, 302b.

Figure 14:
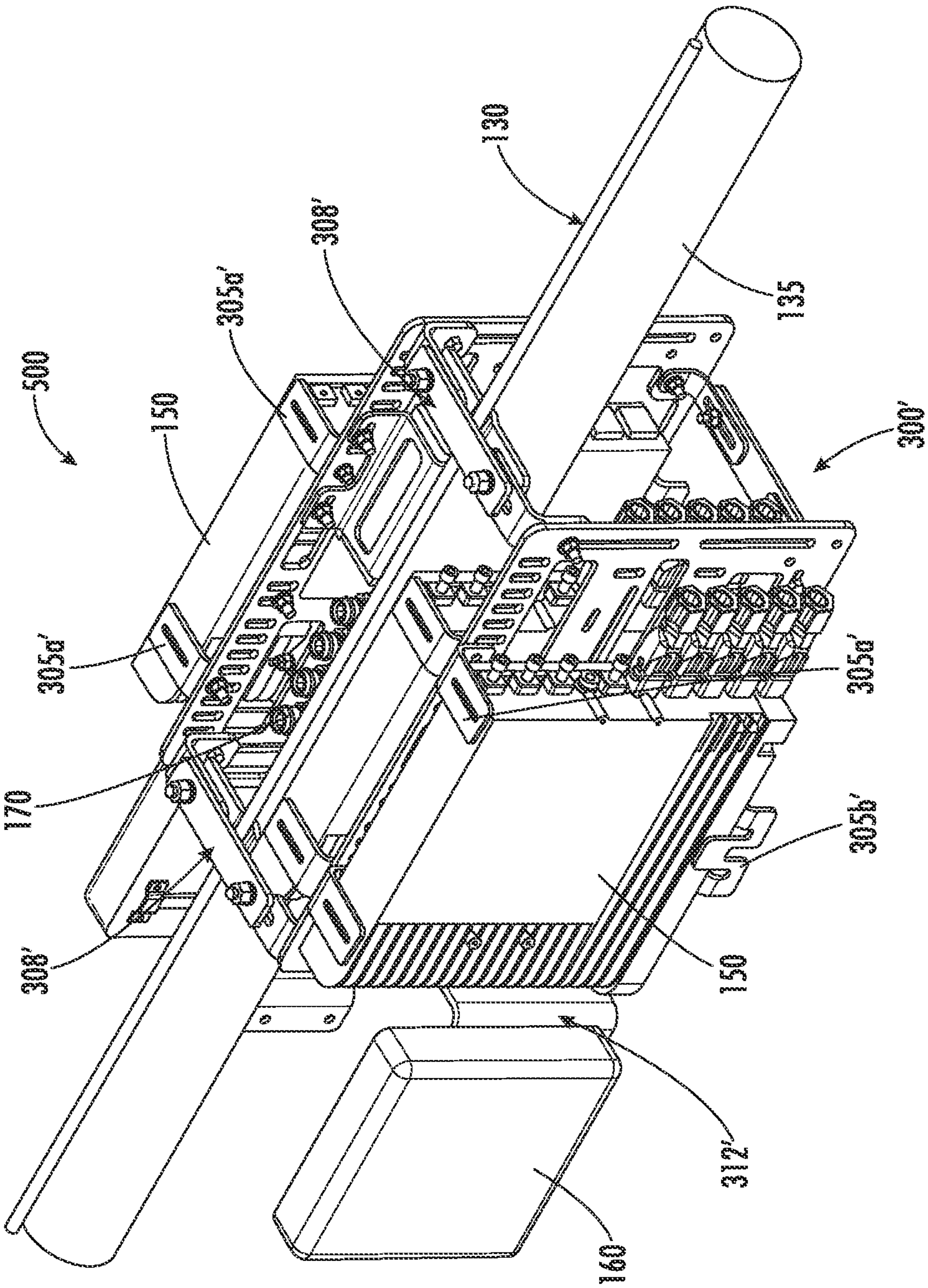
FIG. 14 is a perspective view of the strand mount of FIG. 12A mounted on a cable strand, wherein telecommunications equipment is secured on the mount.

The strand mount 300 also includes a plurality of mounting clamps 308 that are each configured to secure and lock the strand mount 300 to a cable strand 130 (see, e.g., FIG. 14). The side panels 302a, 302b may be secured to the mounting clamps 308 via bolts 310a. In some embodiments, the side panels 302a, 302b may comprise a plurality of elongated slots 310 that are each configured to receive the bolts 310a. The elongated slots 310 may allow the side panels 302a, 302b to be raised or lowered relative to the mounting clamps 308 to assist in balancing the strand mount 300 on a cable strand 130 (e.g., when different size/types of radios 150, antennas 160 and/or other telecommunications equipment 170 are mounted on the side panels 302a, 302b). In some embodiments, the strand mount 300 may also include a plurality of support brackets 309, 311 configured to further secure each side panel 302a, 302b together and create the frame 302. As shown in FIG. 10 and FIG. 11B, side support brackets 309 are each secured to a respective side panel 302a, 302b. A main support bracket 311 is secured between each side support bracket 309 via bolts 309a. In some embodiments, the side support brackets 309 may each comprise a slot 309s through which the respective bolts 309a are received. The slots 309a may allow the distance between the side panels 302a, 302b to be adjusted, for example, increasing or decreasing the distance between the side panels 302a, 302b to fit different sized radios 150 (or other telecommunications equipment 170) mounted to an interior surface of the side panels 302a, 302b (see, e.g., FIGS. 12A-12B).

In some embodiments, the mounting clamps 308 may each comprise two plates 308a, 308b that are held together by two or more bolts 307a. The two plates 308a, 308b of each mounting clamp 308 are configured to clamp and secure a cable strand 130 there between when the strand mount 300 is installed on a cable strand 130 (see, e.g., FIG. 14). In some embodiments, the plates 308a, 308b may comprise a plurality of slots 307 configured to receive the bolts 307a. The slots 307 allow the mounting clamps 308 to be adjustable, for example, to accommodate for different size cable strands 130 and to assist with balancing the strand mount 300 on the cable strand 130.

In some embodiments, the strand mount 300 may further include additional mounting or extension plates 312a, 312b. The extension plates 312a, 312b are configured such that one or more additional small cell radios 150 and/or antennas 160 can be mounted thereon. As shown in FIGS. 11A-11B, the extension plates 312a, 312b extend axially outward from a respective side panel 302a, 302b and extend generally parallel to each other (i.e., a “parallel configuration”). In some embodiments, the extension plates 312a, 312b are configured (e.g., bent) such that a recess R is formed along an interior surface of each extension plate 312a, 312b. The extension plates 312a, 312b (i.e., the recesses R) may be configured such that different sized radios 150 and/or antennas 160 may be mounted thereon. For example, as shown in FIG. 11B and FIG. 11C, in some embodiments, the extension plate 312a may have a larger recess R which extends the extension plate 312a radially outward farther than the extension plate 312b, thereby allowing the extension plate 312a to accommodate a larger sized radio 150 or antenna 160 than the opposing extension plate 312b.

Figure 12A:
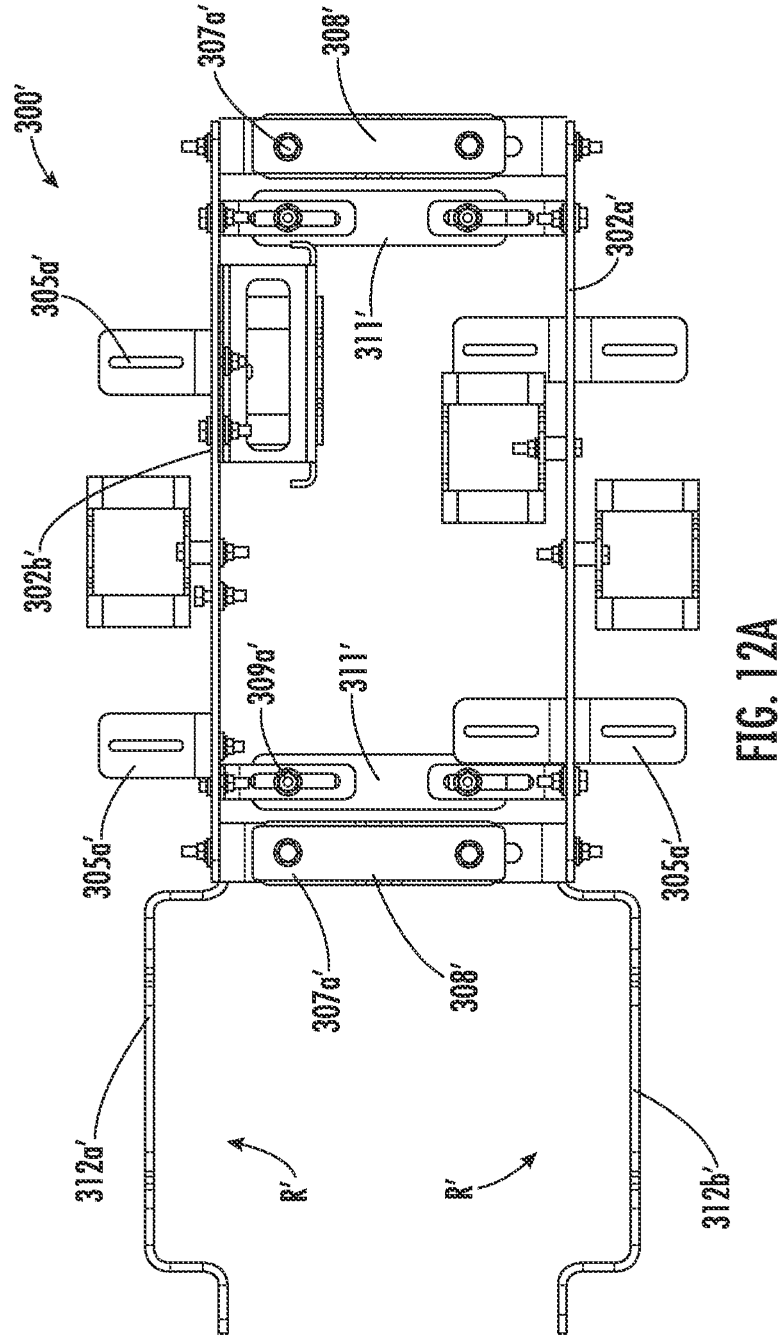
FIG. 12A is a top view of an alternative strand mount having a parallel configuration according to embodiments of the present invention.
Figure 12B:
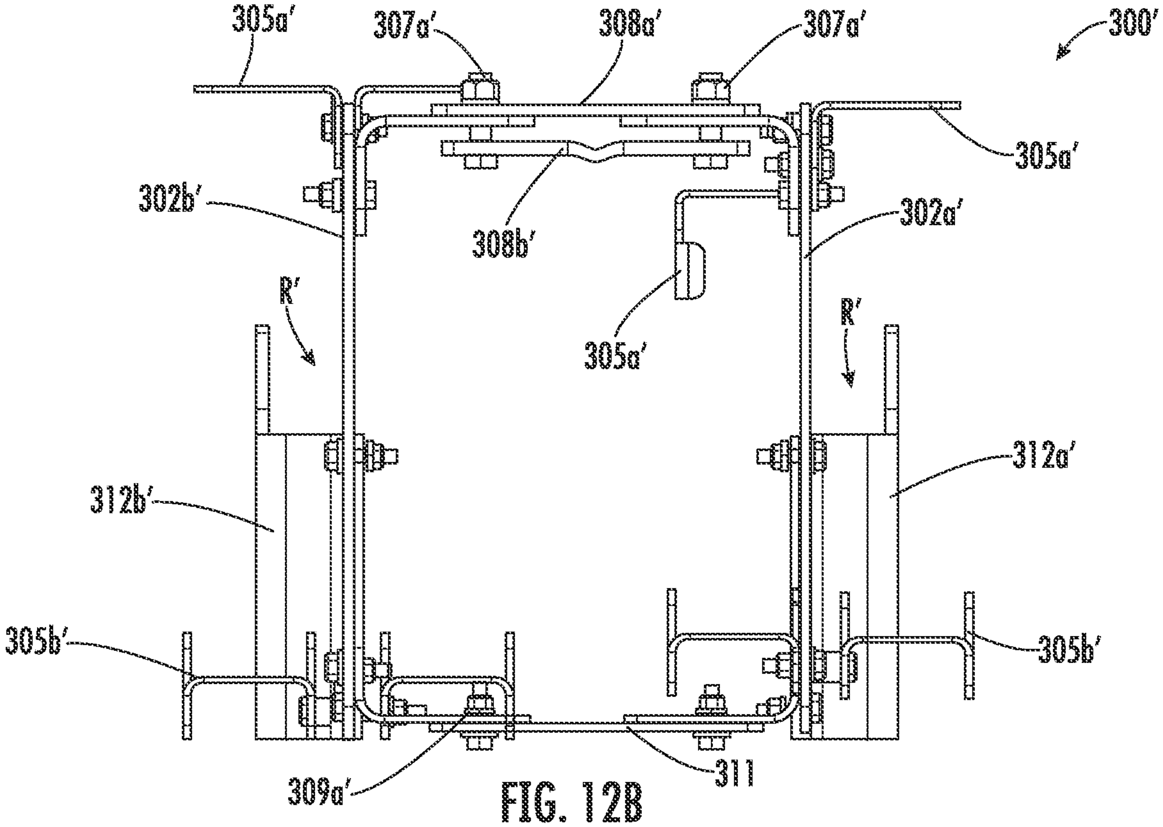
FIG. 12B is an end view of the strand mount of FIG. 12A.

FIGS. 12A-12B illustrate a strand mount 300' similar to the strand mount 300 shown in FIGS. 11A-11C. Strand mount 300' differs in the size of the extension plates 312a', 312b' (and corresponding recesses R') which may be configured hold different sizes and/or types of radios 150 and/or antennas 160 than strand mount 300 described herein. For example, as shown in FIG. 12A, in some embodiments, the recesses R' for extension plates 312a', 312b' are approximately equal in size (compared to strand mount 300 in which extension plate 312a has a larger recess R than extension plate 312b). In some embodiments, the strand mount 300' may comprise additional mounting brackets 305a', 305b' compared to the strand mount 300 shown in FIGS. 11A-11C.

Figure 13A:
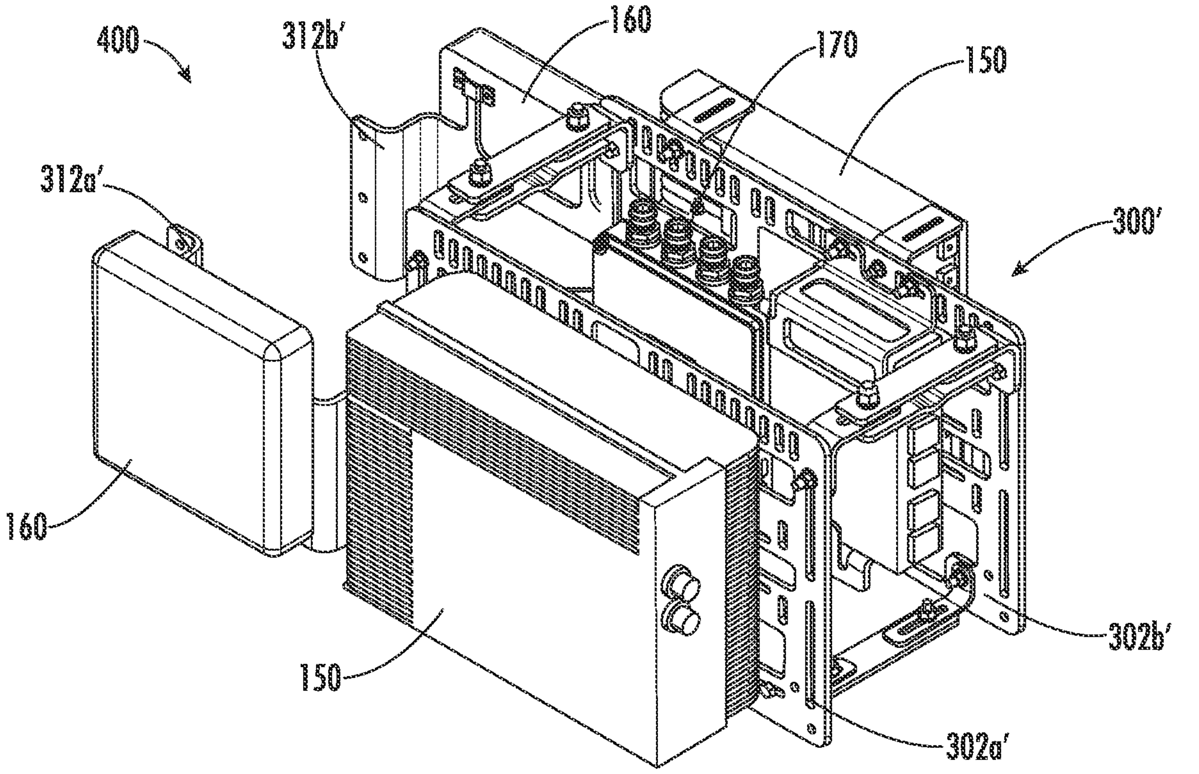
FIG. 13A is a perspective view of the strand mount of FIG. 12A, wherein telecommunications equipment is secured to the mount.
Figure 13B:
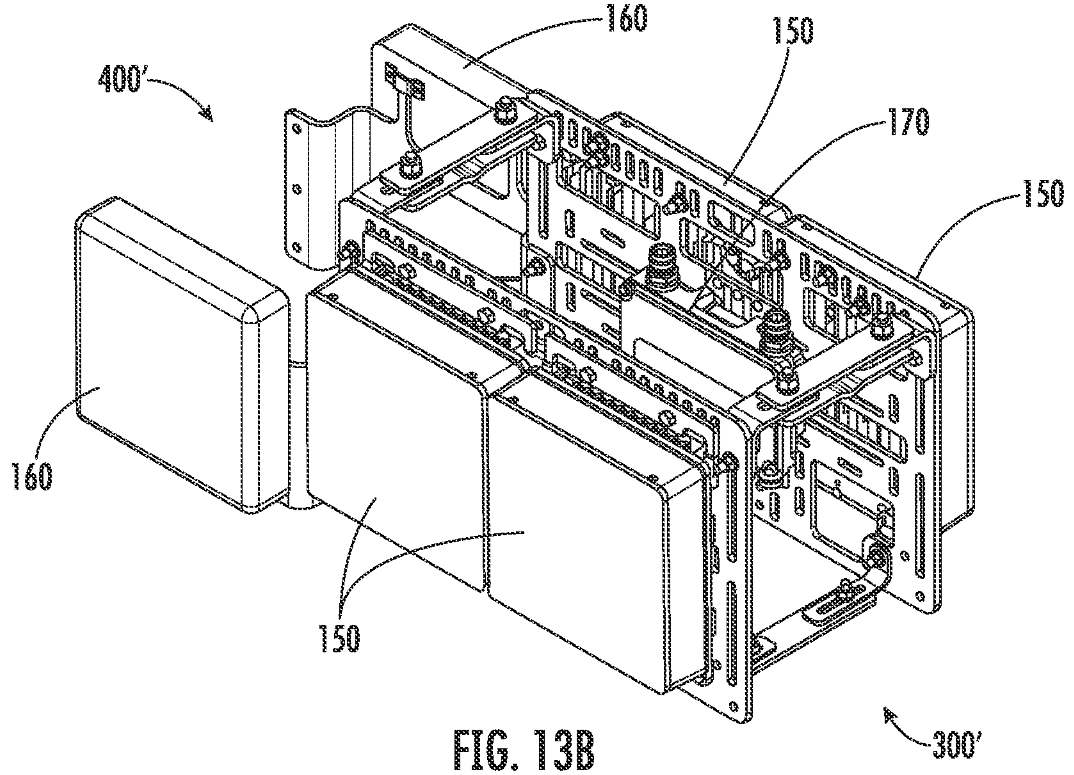
FIG. 13B is a perspective view of the strand mount of FIG. 12A, wherein different telecommunications equipment is secured to the mount.

Referring now to FIGS. 13A-13B, exemplary strand mount assemblies 400, 400' according to embodiments of the present invention, are illustrated. As shown in FIGS. 13A-13B, the strand mount assemblies 400, 400' utilize a strand mount 300, 300' having a “parallel” configuration (i.e., including extension plates 312a, 312b). In some embodiments, for example, as shown in FIG. 13A, the strand mount assembly 400 may have an antenna 160 secured to each extension plate 312a, 312b, a radio 150 secured to the exterior surface of each side panels 302a, 302b, and additional telecommunications equipment 170 (e.g., a diplexer) secured to an interior surface of at least one of the side panels 302a, 302b. The assembly 400' illustrated in FIG. 13B is similar to assembly 400 except differs in that the exterior surface of each side panel 302a, 302b has two radios 150 secured thereto. It should be noted that these assemblies 400, 400' are only shown for exemplary purposes, and a person of ordinary skill in the art would understand that various configurations (i.e., types, sizes, and numbers of radios 150, antennas 160, and/or other telecommunications equipment 170 may be employed utilizing the strand mounts 300, 300' described herein.

FIG. 14 illustrates an exemplary strand mount assembly 500 according to embodiments of the present invention where the strand mount 300' is secured to a cable strand 130. As shown in FIG. 14, the cable strand 130 is secured between the mounting clamps 308, thereby securing the strand mount 300' (and corresponding radios 150, antennas 160, and/or other telecommunications equipment 170) to the cable strand 130. A bundle of cables 135 (e.g., power cables, telecommunications cables, etc.) extends parallel to the cable strand 130 and through the strand mount 300'. In some embodiments, as shown in FIG. 14, mounting brackets 305a', 305b' may also be used to help support/secure the radios 150 to the side panels 302a', 302b' of the strand mount 300'. Other strand mounts 300, 300" described herein may be secured to a cable strand 130 in a similar manner.

Figure 15A:
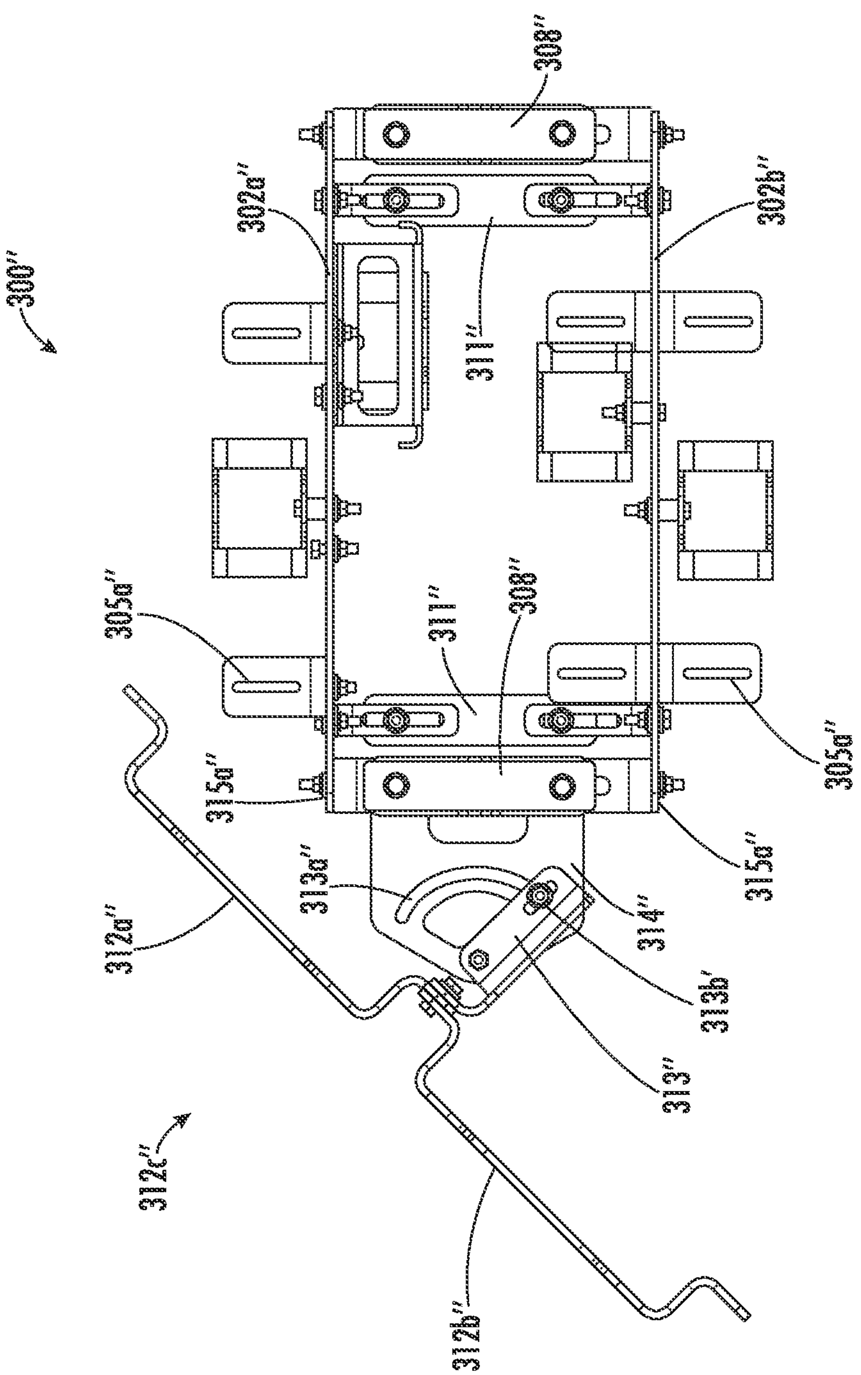
FIG. 15A is a top view of an alternative strand mount having a rotational configuration according to embodiments of the present invention.
Figure 15B:
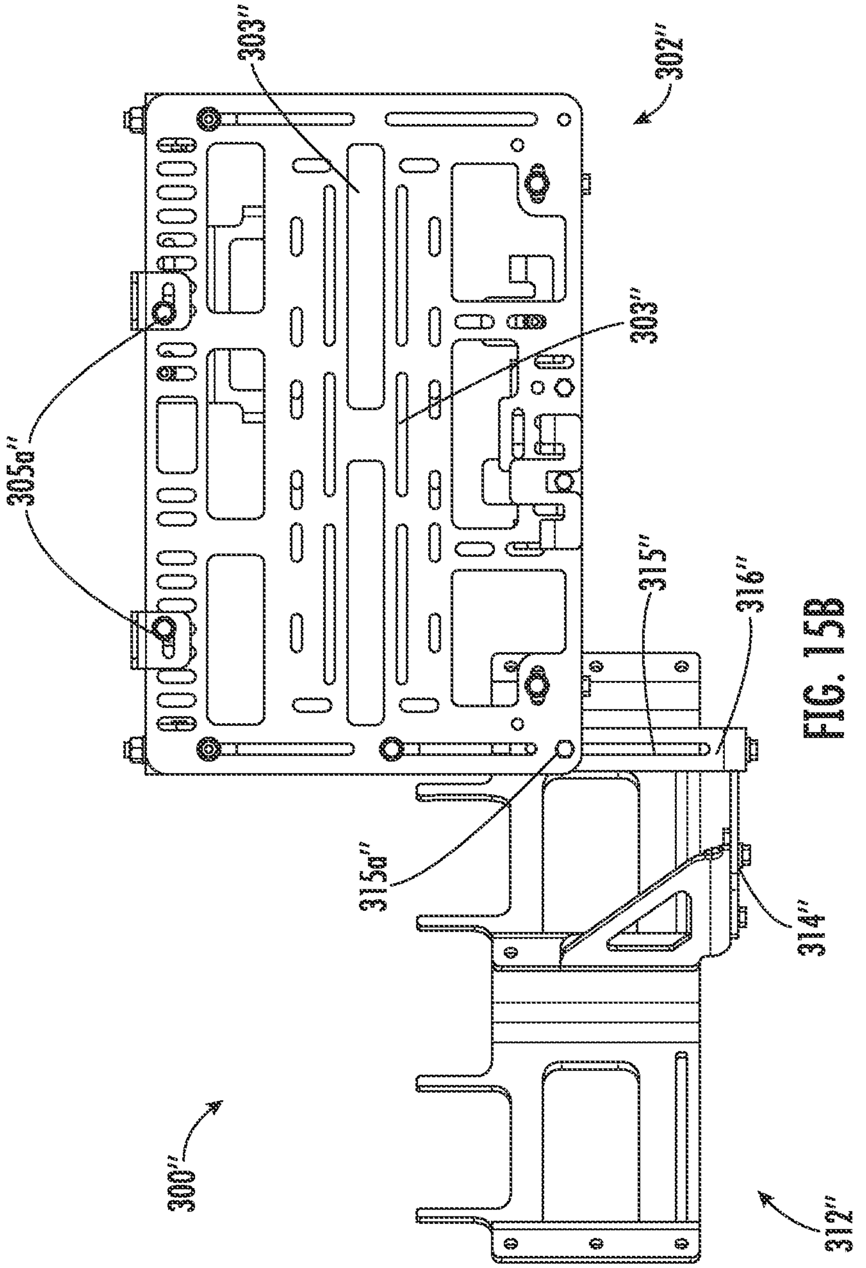
FIG. 15B is a side view of the strand mount of FIG. 15A.
Figure 15C:
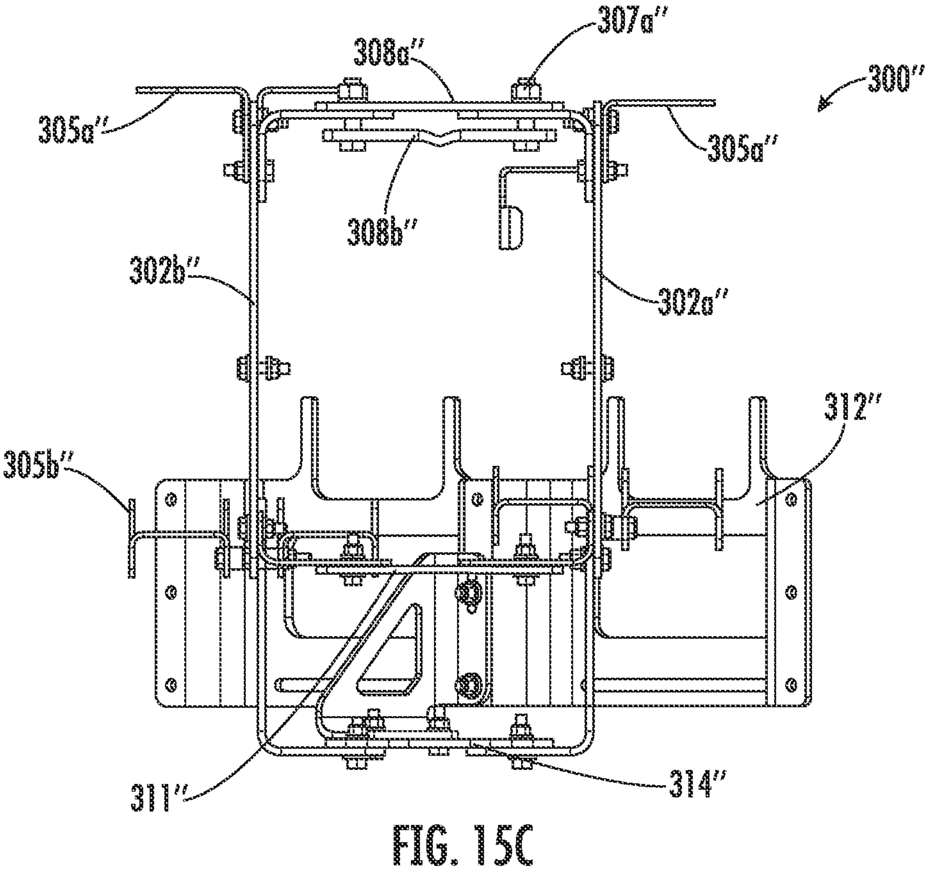
FIG. 15C is an end view of the strand mount of FIG. 15A.

Referring now to FIGS. 15A-15C, an alternative strand mount 300" according to embodiments of the present invention is illustrated. Properties and/or features of the strand mount 300" and/or strand mount assemblies 600, 600' may be as described above in reference to FIGS. 10-14 and duplicate discussion thereof may be omitted herein for the purposes of discussing FIGS. 15A-16B.

The strand mount 300" is similar to the strand mounts 300, 300' described herein in that the mount 300" includes a frame 302" comprising two opposing side panels 302a", 302b" that are configured such that a small cell radio 150, antenna 160, and/or other telecommunications equipment 170 (e.g., diplexer, triplexer, etc.) can be mounted thereon. Each side panel 302a", 302b" may comprise a plurality of perforations or slots 303" configured such that different sizes/types of radios 150 or antennas 160 may be secured to the mount 300" while also allow some of the heat generated by the radios/antennas 150, 160 to escape and also allow air to circulate through the mount 300", thereby helping to prevent the radios/antennas 150, 160 from overheating.

In some embodiments, the strand mount 300" may also comprise a plurality of mounting brackets 305*a*", 305*b*" configured to provide further support to the radios 150, antennas 160 and/or other telecommunications equipment 170 that may be secured to the side panels 302*a*", 302*b*". The strand mount 300" further includes a plurality of mounting clamps 308" that are each configured to secure and lock the strand mount 300" to a cable strand 130, similar to other strand mounts 300, 300' described herein (see, e.g., FIG. 14).

Similar to strand mounts 300, 300', in some embodiments, the strand mount 300" may also include a plurality of support brackets 309", 311" configured to further secure each side panel 302*a*", 302*b*" together. The support brackets 309", 311" may allow the distance between the side panels 302*a*", 302*b*" to be adjusted, for example, increasing or decreasing the distanced between the side panels 302*a*", 302*b*" to fit different sized radios 150 (or other telecommunications equipment 170) mounted to an interior surface the side panels 302*a*", 302*b*".

The strand mount 300" differs from strand mounts 300, 300' in that rather than having two extension plates 312*a*, 312*b* (312*a*', 312*b*') that extend outwardly from the side panels 302*a*, 302*b* (302*a*', 302*b*'), the strand mount 300" includes a mounting plate 312*c*" that may be secured to the end of the strand mount 300". The mounting plate 312*c*" may comprise a pair of arms 312*a*", 312*b*" sized and configured such that one or more antennas 160 may be secured thereto. Similar to the strand mount 200" described herein (see, e.g., FIGS. 9C-9D), when secured to the end of the strand mount 300", the mounting plate 312*c*" may be rotated and locked at an angle (0), for example, to achieve a desired azimuth for the mounted antennas 160.

As shown in FIGS. 15A-15C, in some embodiments, a flange 314" may extend outwardly from an end of the strand mount 300". The flange 314" includes an arcuate slot 313*a*". The mounting plate 312*c*" may be coupled to the flange 314" via a mounting bracket 313". The mounting bracket 313" may be secured to the flange 314" via a bolt 313*b*" that is received through the arcuate slot 313*a*". The bolt 313*b*" may be slid along the arcuate slot 313*a*", thereby rotating the mounting plate 312*c*". The bolt 313*b*" may be slid within the arcuate slot 313*a*" until the desired angle (0) is reached, then the bolt 313*b*" may be tightened to lock the mounting plate 312*c*" (and antenna(s) 160 mounted thereon) in place at that angle (0).

As shown in FIG. 15B, in some embodiments, the flange 314" may be secured to the strand mount 300" such that the flange 314" resides below a bottom edge of the side panels 302*a*", 302*b*". In some embodiments, the flange 314" may be coupled to the end of the strand mount 300" via a pair of extension members 316". Each extension member 316" may be secured to a respective side panel 302*a*", 302*b*" via a bolt 315*a*". In some embodiments, the extension members 316" may comprise an elongated slot 315" configured to receive the bolts 315*a*". The elongated slots 315" may allow the flange 314" (and mounting plate 312*c*") to be raised or lowered relative to the strand mount 300", thereby allowing the vertical elevation (i.e., horizontal plane) of the antenna(s) 160 secured thereto to be adjusted.

Figure 16A:
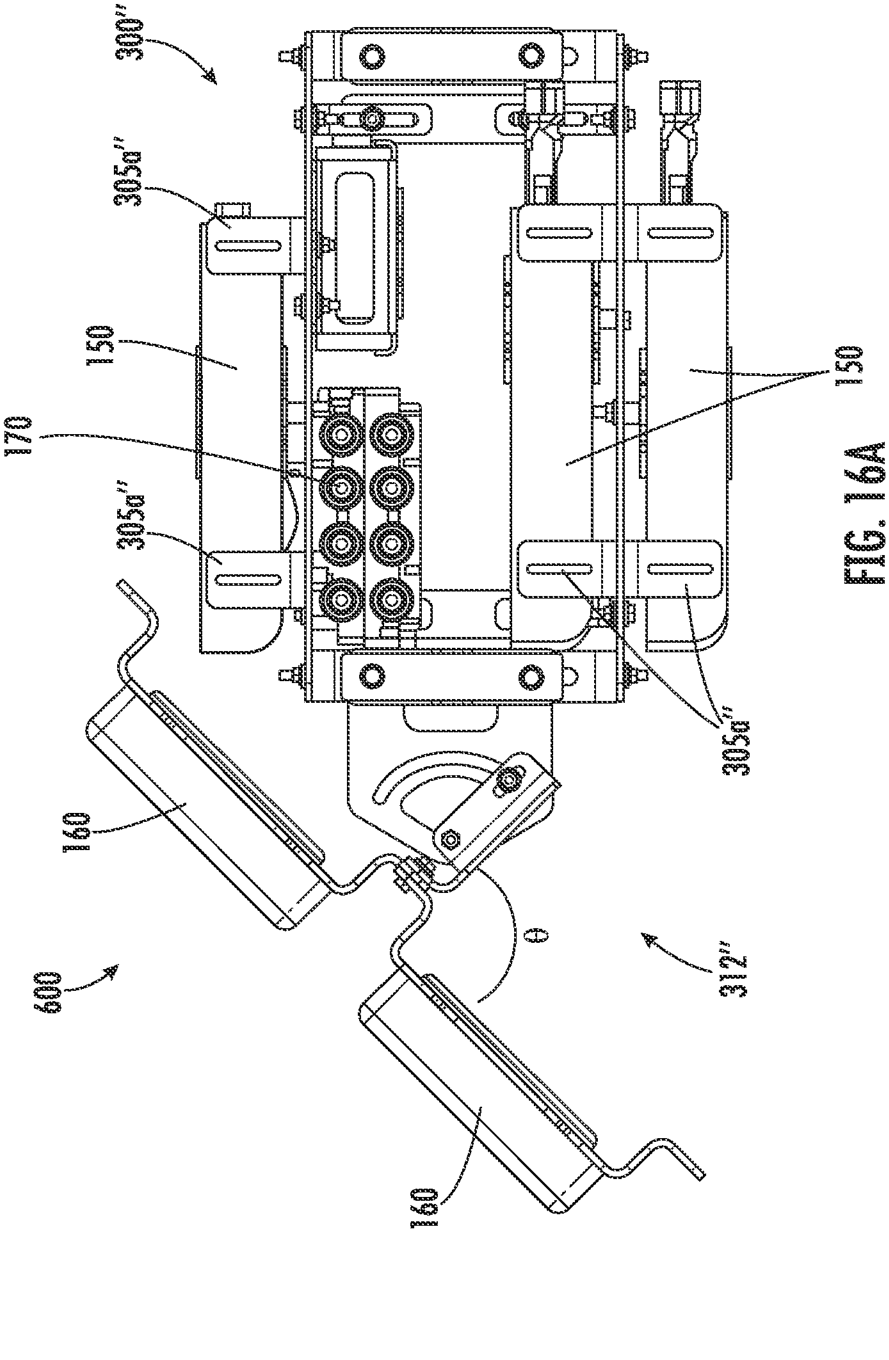
FIG. 16A is a top view of the strand mount of FIG. 15A, wherein telecommunications equipment is secured on the mount.
Figure 16B:
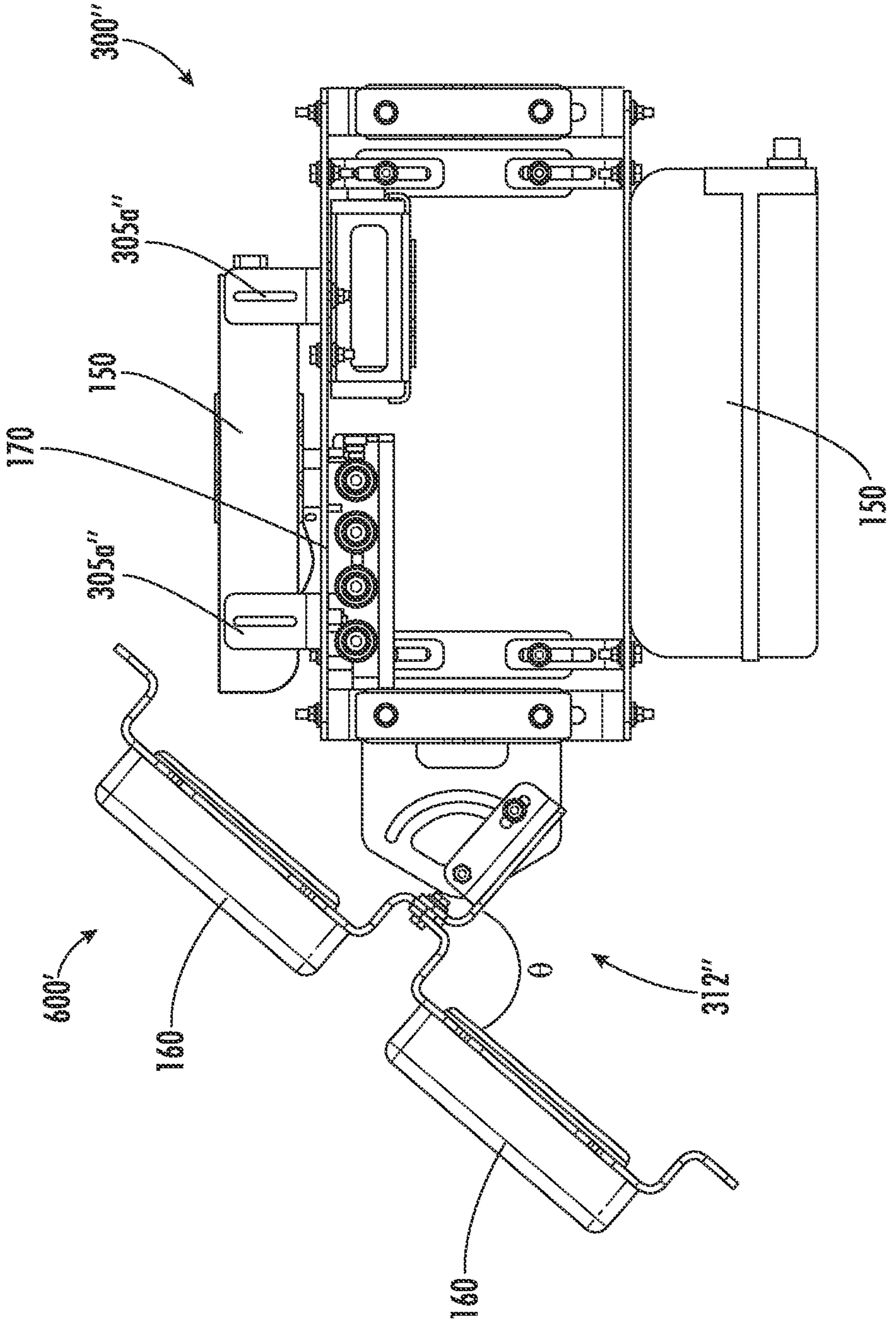
FIG. 16B is a top view of the strand mount of FIG. 15A, wherein different telecommunications equipment is secured on the mount.

Referring now to FIGS. 16A-16B, exemplary strand mount assemblies 600, 600' according to embodiments of the present invention are illustrated. The strand mount assemblies 600, 600' utilize a strand mount 300" having a "rotational" configuration (i.e., mounting plate 312*c*"). In some embodiments, for example, as shown in FIG. 16A, the strand mount assembly 600 may have multiple antennas 160 secured to the mounting plate 312*c* which is rotated at a desired angle (0). Multiple radios 150 may secured to the exterior surface of each side panels 302*a*", 302*b*" and supported by mounting brackets 305*a*", 305*b*" (some not shown). In some embodiments, additional radios 150 and/or other telecommunications equipment 170 (e.g., a diplexer) may be secured to an interior surface of at least one of the side panels 302*a*", 302*b*". The assembly 600' illustrated in FIG. 16B is similar to assembly 600 except differs in the number and size of the radios 150 and telecommunications equipment 170 that is secured to the exterior and interior surfaces of each side panel 302*a*", 302*b*" of the strand mount 300". It should be noted that these assemblies 600, 600' are only shown for exemplary purposes, and a person of ordinary skill in the art would understand that various configurations (i.e., types, sizes, and numbers of radios 150, antennas 160, and/or other telecommunications equipment 170 may be employed utilizing the strand mount 300" described herein.

In some embodiments, the strand mounts 100, 100', 100", 100'", 200, 200', 200", 300, 300', 300" of the present invention described herein may be formed from aluminum or an aluminum alloy. The mounts 100, 100', 100", 100'", 200, 200', 200", 300, 300', 300" of the present invention described herein may be used in association with a variety of different small cell radios 150 and/or antennas 160 (and related telecommunications equipment). For example, in some embodiments, the small cell radio 150 is a picocell radio. A picocell is a small cellular base station covering a smaller scale cell site, such as within buildings.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A strand mount, comprising:

a top plate, a bottom plate, and opposing side plates that form a housing having an interior cavity dimensioned to fit around one or more small cell radios and/or antennas;

a plurality of mounting arms removably attached to the top plate and extending downwardly into the interior cavity, each mounting arm configured such that a small cell radio and/or antenna can be mounted thereto; and one or more mounting brackets configured to hang the strand mount on a cable strand.

2. The strand mount of claim 1, wherein the strand mount is secured on a cable strand by the one or more mounting brackets.

3. The strand mount of claim 1, wherein at least one of the top plate, bottom plate, and/or side plates comprises perforations.

4. The strand mount of claim 1, further comprising an external mount plate extending outwardly from an edge of the top or bottom plates and configured such that one or more small cell radios and/or antennas can be mounted thereto.

5. The strand mount of claim 1, further comprising one or more small cell radios and/or antennas mounted to the mounting arms and/or external mounting plate.

6. The strand mount of claim 1, further comprising a support member coupled to and extending longitudinally down a center of the top plate.

7. The strand mount of claim 6, wherein the plurality of mounting arms is removably attached to the support member.

8. The strand mount of claim 1, wherein the one or more small cell radios is a picocell radio.

9. A strand mount, comprising:

a top plate, a bottom plate, and opposing side plates that form a housing having an interior cavity dimensioned to fit around one or more small cell radios and/or antennas;

a center mounting frame secured to an inner surface of the top plate and extending downwardly into the interior cavity, the mounting frame having opposing sides, each configured such that one or more small cell radios and/or antennas can be mounted thereto; and one or more mounting brackets configured to hang the strand mount on a cable strand.

10. The strand mount of claim 9, wherein the mount is secured on the cable strand by the one or more mounting brackets.

11. The strand mount of claim 9, wherein at least one of the top plate, bottom plate, and/or side plates comprises perforations.

12. The strand mount of claim 9, further comprising an external mounting plate extending outwardly from an edge of the top or bottom plates and configured such that one or more small cell radios and/or antennas can be mounted thereto.

13. The strand mount of claim 12, further comprising one or more small cell radios and/or antennas mounted to the center mounting frame and/or external mounting plate.

14. The strand mount of claim 13, wherein the one or more small cell radios is a picocell radio.

* * * * *